(12) United States Patent
Vaziri et al.

(10) Patent No.: US 12,546,979 B2
(45) Date of Patent: Feb. 10, 2026

(54) TECHNIQUES FOR HIGH-SPEED VOLUMETRIC SAMPLING

(71) Applicant: The Rockefeller University, New York, NY (US)

(72) Inventors: Alipasha Vaziri, Greenwich, CT (US); Jeffrey Dakin Demas, Astoria, NY (US)

(73) Assignee: The Rockefeller University, New York, NY (US)

( * ) Notice: Subject to any disclaimer, the term of this patent is extended or adjusted under 35 U.S.C. 154(b) by 756 days.

(21) Appl. No.: 17/796,295

(22) PCT Filed: Jan. 31, 2021

(86) PCT No.: PCT/US2021/015957
§ 371 (c)(1),
(2) Date: Jul. 29, 2022

(87) PCT Pub. No.: WO2021/155330
PCT Pub. Date: Aug. 5, 2021

(65) Prior Publication Data
US 2023/0152561 A1   May 18, 2023

Related U.S. Application Data

(60) Provisional application No. 63/122,508, filed on Dec. 8, 2020, provisional application No. 63/106,684, filed
(Continued)

(51) Int. Cl.
*G02B 21/00* (2006.01)
*G02B 17/08* (2006.01)
(Continued)

(52) U.S. Cl.
CPC ..... *G02B 21/0032* (2013.01); *G02B 17/0844* (2013.01); *G02B 21/0076* (2013.01);
(Continued)

(58) Field of Classification Search
CPC .............. G02B 21/0032; G02B 27/283; G02B 2207/114
See application file for complete search history.

(56) References Cited

U.S. PATENT DOCUMENTS

2014/0246612 A1    9/2014   Spiecker
2015/0362714 A1*  12/2015   Iga .................... G02B 21/002
                                                                    359/372

(Continued)

OTHER PUBLICATIONS

International Search Report and Written Opinion issued Jul. 16, 2021 in corresponding PCT/US2021/015957.
(Continued)

*Primary Examiner* — Thanh Luu
(74) *Attorney, Agent, or Firm* — NovoTechIP International PLLC

(57) ABSTRACT

A multiplexing module provided herein is configured to perform operations of receiving a plurality of laser pulses from a pulsed laser source; splitting each laser pulse into a plurality of beamlets; introducing a delay between each adjacent beamlet of the plurality of beamlets, such that the plurality of beamlets associated with a respective laser pulse of the plurality of laser pulses is distributed equally across a pulse repetition period associated with the pulsed laser source; changing a divergence of each subsequent beamlet of the plurality of beamlets associated with each respective laser pulse to introduce a distinguishing feature between each beamlet of the plurality of beamlet to cause each beamlet to focus on a different axial plane or lateral position of the sample; and outputting the plurality of beamlets associated with each respective laser pulse.

12 Claims, 19 Drawing Sheets

Related U.S. Application Data on Oct. 28, 2020, provisional application No. 62/968,330, filed on Jan. 31, 2020.

(51) Int. Cl.
  *G02B 27/28* (2006.01)
  *G02F 1/01* (2006.01)

(52) U.S. Cl.
  CPC ....... *G02B 21/0084* (2013.01); *G02B 27/283* (2013.01); *G02F 1/0136* (2013.01); *G02B 2207/114* (2013.01)

(56) References Cited

U.S. PATENT DOCUMENTS

2016/0246062 A1    8/2016  Namiki et al.
2016/0359292 A1*  12/2016  Chuang ............... G03F 7/70025

OTHER PUBLICATIONS

International Preliminary Report on Patentability issued Aug. 11, 2022 in corresponding PCT/US2021/015957.

Jeffrey Demas, et al., "High-Speed, Cortex-Wide Volumetric Recording of Neuroactivity at Cellular Resolution using Light Beads Microscopy," Original Manuscript (41 pages).

Jeffrey Demas, et al., "High-speed, cortex-wide volumetric recording of neuroactivity at cellular resolution using light beads microscopy," Nat Methods. Sep. 2021 ; 18(9): 1103-1111. doi:10.1038/s41592-021-01239-8 (41 pages) (official publication of the NPL1 Manuscript).

Dmitri Tsyboulski, et al., Remote focusing system for simultaneous dual-plane mesoscopic multiphoton imaging, bioRxiv 503052, Dec. 20, 2018 (11 pages) (doi: https://doi.org/10.1101/503052).

Yu-Hsuan Tsai, et al., "Two-photon microscopy at >500 volumes/second," bioRxiv 349712, Oct. 21, 2020 (3 pages) (doi: https://doi.org/10.1101/2020.10.21.349712).

* cited by examiner

TECHNIQUES FOR HIGH-SPEED VOLUMETRIC SAMPLING

CROSS-REFERENCE TO RELATED APPLICATIONS

This application claims the benefit of priority from PCT Application Serial No. PCT/US21/15957, filed on Jan. 31, 2021, entitled "Techniques for High-Speed Volumetric Sampling," which claims priority from U.S. Provisional Patent Application Ser. No. 62/968,330, filed on Jan. 31, 2020, and entitled "Massively Axial Multiplexed Mesoscopy," and from U.S. Provisional Patent Application Ser. No. 63/122,508, filed on Dec. 8, 2020, and entitled "High-Speed, Cortex-Wide Volumetric Recording of Neuroactivity at Cellular Resolution Using Light Beads Microscopy," and from U.S. Provisional Patent Application Ser. No. 63/106,684, filed on Oct. 28, 2020, and entitled "Mesoscopic Signal Neuron Resolution Volumetric Ca2+ Imaging." The content of all of these applications is incorporated herein by reference in their entirety.

GOVERNMENT LICENSE RIGHTS

This invention was made with government support under NS103488 awarded by the National Institutes of Health. The government has certain rights in the invention.

TECHNICAL FIELD

The described subject matter relates to microscopic systems, and methods of use thereof.

BACKGROUND

Two-photon (2p) scanning microscopy paired with genetically encoded Calcium indicators (GECIs) has become the gold-standard for recording activity, particularly at depth, in scattering brain tissue. However, 2p microscopy systems are still limited in both volumetric field-of-view (FOV) and recording speed by the need to scan a small, focused beam in order to form an image. To begin to understand the underlying cortical circuitry behind emergent, complex behavior in human-analogous models, tools are required that can record the activity of single neurons, across depth, and in multiple cortical areas simultaneously.

Current state-of-the-art scanning techniques face a number of technical limitations related to large-scale functional imaging of the mammalian brain. Understanding how sensory information and behavioral states are encoded within the mammalian brain requires the ability to record the activity of large populations of individual neurons distributed across functional and anatomical regions that span the entire cortex in awake and behaving animals. However, the inherent tradeoffs among imaging speed (i.e., voxel acquisition rate), spatial resolution, signal to noise ratio (SNR) and the size of the recording volume, and the finite limits of brain exposure to laser power have prevented the realization of a mesoscopic-scale volumetric imaging of single neuron activity across different layers of the entire cortical surface at adequate physiological volume rates. Solving this engineering challenge within the constrained and highly interrelated parameter space necessitates a principled approach that thus far has been missing in previous realizations of calcium (Ca2+) imaging. Hence, there is a need for improved systems and methods that provide a technical solution for overcoming the inherent tradeoffs a speed, resolution, and acquisition volume-size of current scanning techniques.

SUMMARY

In one general aspect, the instant application describes a multiplexing module. The multiplexing module is configured to perform operations of: receiving a plurality of laser pulses from a pulsed laser source; splitting each laser pulse into a plurality of beamlets; introducing a delay between each adjacent beamlet of the plurality of beamlets, such that the plurality of beamlets associated with a respective laser pulse of the plurality of laser pulses is distributed equally across a pulse repetition period associated with the pulsed laser source; changing a divergence of each subsequent beamlet of the plurality of beamlets associated with each respective laser pulse to introduce a distinguishing feature between each beamlet of the plurality of beamlet to cause each beamlet to focus on a different axial plane or lateral position of the sample; and outputting the plurality of beamlets associated with each respective laser pulse.

In another general aspect, the instant application describes a spatial multiplexing module. The spatial multiplexing module is configured to perform the operations of: receiving a plurality of laser pulses from a pulsed laser source; splitting the plurality of laser pulses into a plurality of spatially separated laser pulses; and outputting the plurality of spatially separated laser pulses. The spatial multiplexing module provides for equal splitting of power while minimizing dispersion and introduces no pathlength difference between the plurality of laser pulses.

In another general aspect, the instant application describes an optical modulation module. The optical modulation module is configured to perform the operations of: receiving a plurality of beamlets associated with each laser pulse of a plurality of laser pulses, wherein each a volume of a sample; determining whether an object of interest is present at a respective location within the volume of the sample associated with each beamlet of the plurality of beamlets associated with each laser pulse; selectively adjust the amount of power associated with a set of beamlets from the plurality of beamlets for which no object of interest is located at the respective location in the volume associated with the respective location in the volume of the sample associated with the respective beamlet to reduce an amount of light associated with the set of beamlets from reaching the sample to generate modified beamlets; and outputting the modified beamlets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
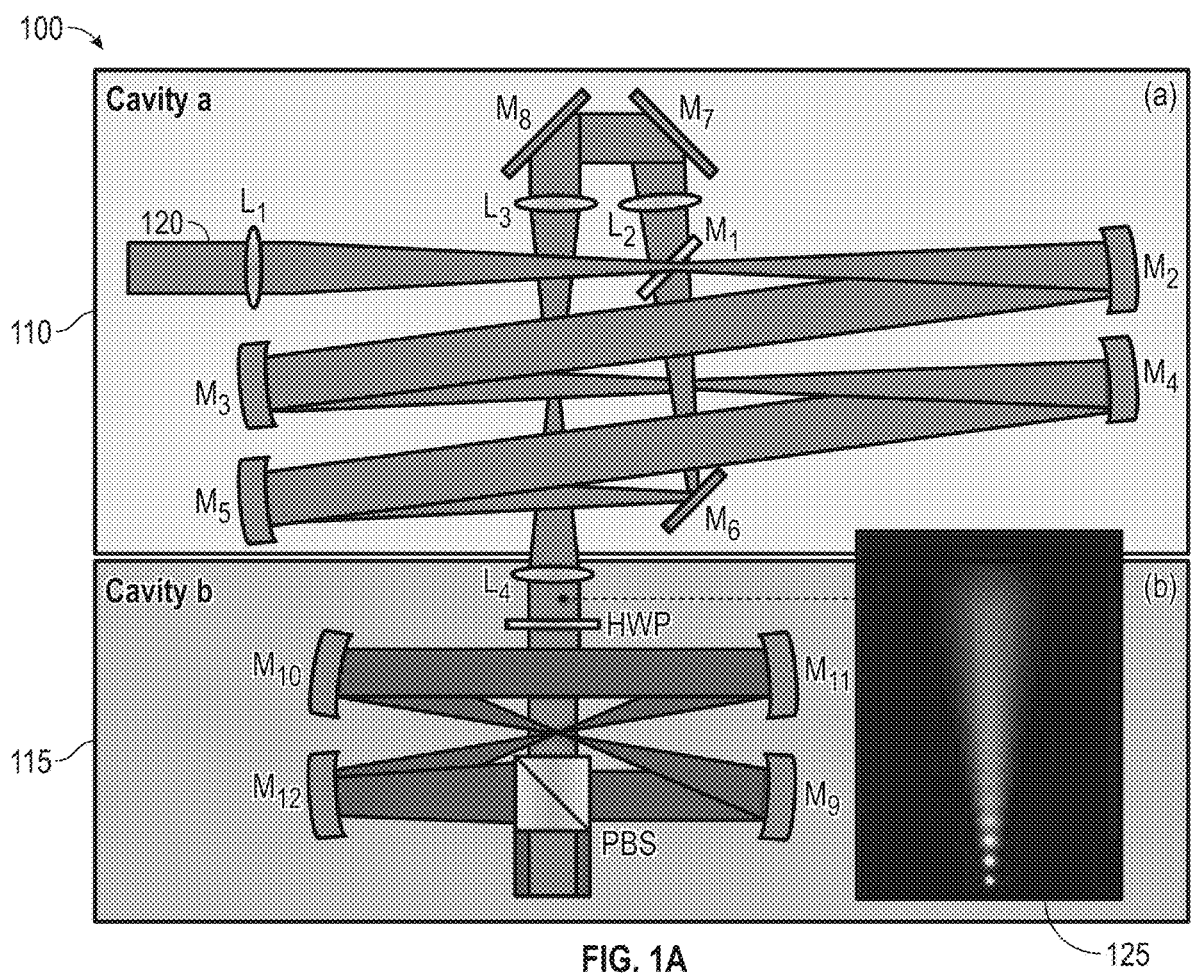
FIG. 1A is a diagram showing an example implementation of the spatiotemporal multiplexing module that may be used by Massively Axial Multiplexed Mesoscopy (MAxiMuM).

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the p[resent teachings.

The imaging techniques provided herein provide a technical solution to the technical problem of overcoming the inherent tradeoffs among speed, resolution, sampling density and acquisition volume-size of current scanning techniques discussed above in particular in scattering or other types of samples that require different pulse energies to be delivered at different sample locations. The Massively Axial Multiplexed Mesoscopy (MAXiMuM), Light Beads Microscopy (LBM), and Co-linear Many-fold Axial Multiplexing (c-MAM) techniques presented herein provide technical solutions improving imaging techniques for volumetric recordings. These techniques may be used for volumetric recording of neural activity or for volumetric recordings of other types of activity within a sample. Some implementations of these techniques provide a spatiotemporal multiplexing module that facilitates excitation of the sample across multiple axial planes of the sample which eliminates the need for axial scanning required by current scanning techniques. Other implementations provide a spatiotemporal multiplexing module that facilitates excitation of the sample across multiple laterally separated regions of the sample. The spatiotemporal multiplexing module generates, from a laser pulse, a set of axially or laterally separated and temporally distinct foci referred to herein as "light beads." These light beads may be used to in axial scanning to rapidly record information throughout the entire depth of the sample at the same time and at a rate that often exceeds the rate at which current microscopes record a single voxel on a single axial plane of a sample. Alternatively, the light beads may be used to laterally scan across multiple sampling locations of a lateral plane of the sample rather than across multiple axial planes of the sample. As a result, the imaging techniques provided herein may scan an entire volume in the same amount of time that current microscopes take to scan a single axial plane of a sample, because the spatiotemporal multiplexing module facilitates simultaneous scanning across multiple axial planes of the sample. Another technical benefit of these approaches is that the individual light beads may be dynamically and individually switched on and off or the power delivered to them individually and arbitrarily tuned during the scanning process based on the location of an object of interest, such as but not limited to a neuron, cell, or other object of interest in sample, to reduce the utilized power level at the sample. These and other technical benefits of the techniques disclosed herein will be evident from the discussion of the example implementations that follow. While these examples discuss applying these techniques to calcium imaging for recording activity of neurons at high speed in a large volume, these techniques may be applied in any context for which volumetric imaging is to be provided. The techniques provided herein may be used with other types of biological and/or non-biological samples. Furthermore, the type of scanning that may be performed is not limited to fluorescence to study the properties of a sample. Other types of optical properties of the samples may be studied, including but not limited to scattering, reflection, and attenuation or absorption of properties of the organic or inorganic samples being studies.

MAXiMuM

MAXiMuM is a module for volumetric sampling. MAxiMuM optimizes temporal and spatial sampling in combination with spatiotemporal axial or lateral multiplexing, to facilitate fully volumetric imaging through 2D scanning. MAxiMuM may be applied to Calcium ($Ca^{2+}$) imaging, voltage imaging, and/or other types of imaging.

MAXiMuM provides a technical solution to the technical problem of overcoming the inherent tradeoffs between speed, resolution, and acquisition volume-size of current scanning techniques with an optimized spatial and temporal sampling strategy that maximizes neuron extraction fidelity for objects of interest in a sample within a finite power budget and a spatiotemporal multiplexing module for sampling axially without the need for axial scanning. MAxiMuM is a scalable solution that further provides the ability to control the pulse energy of each of a set of beamlets in a relatively lossless manner as will be described in greater detail in the examples which follow. Furthermore, the pulse energy of each beamlet may be arbitrarily set as will be discussed in the examples which follow.

Sampling in a scanning 2p microscope may be optimized by determining a minimum number of pixels required to sample a neuronal cell body or other object of interest with sufficient spatial and temporal signal to faithfully extract a time series associated with the neuronal body or other object of interest from surrounding noise for a given shape of the microscope's point-spread function (PSF). In the case of a Gaussian PSF, the minimum sampling criterion may be investigated by analyzing the receiver operating characteristics of neuron detection as a function of downsampling the data. To that end, multiple single-plane videos of mouse brain tissue have been run through an automated neuronal extraction pipeline based on the CalmAn tools for identifying active neurons in brain images and the statistics of neuronal detection were determined as spatial pixels were removed from the data set. An F-score representing a measure of the accuracy of the analysis may be obtained. The F-score may be defined as the harmonic mean of the true-positive and false-negative detection rates as a function of the effective pixel size. Extraction fidelity may be preserved up to a pixel size of ~5 µm, as predicted by the Nyquist theorem for a mean neuron size of ~12 µm. While many of the example implementation discuss imaging of brain tissue, the techniques provided herein are not limited to imaging of neurons within a volume of brain tissue or other types of cells in other types of tissue. Other types of organic and/or inorganic samples may be scanned using these techniques to image objects of interest within a volume of the sample.

If extraction fidelity is to be preserved within a plane, the axial resolution and sampling must be designed to detect signal from all neurons or other objects of interest present without a high probability of detecting multiple neurons or other objects of interest within a voxel. Accordingly, some implementations of MAXiMuM have been designed for 15 µm axial pixels and a PSF with axial extent <20 µm full width at half maximum (FWHM). Due to the Gaussian shape of the PSF, the lateral size (FWHM ~1.xx µm) is significantly smaller than the maximum lateral pixel size (5 µm). This resolution disparity can be addressed by using temporal focusing (TeFo) to create a larger lateral PSF diameter without extending axially. However, this can be optional when demonstrating the capability to switch to high resolution (~1 µm) on the fly. However, TeFo modules are compatible with the MAxiMuM multiplexing module. While the application references specific axial pixel sizes and PSF sizes in the various example implementations provided herein, these examples are intended to illustrate possible configurations of MAXiMuM but do not limit MaXiMuM to these specific example implementations.

Conventional volumetric scanning 2p microscopes needs scanning along the optical axis, requiring scanning of each plane in the volume sequentially, and thus severely limiting the obtainable volumetric acquisition rate. MAxiMuM provides a technical solution to this problem by eliminating axial scanning and instead sampling along the axis through a series of 30 spatiotemporal multiplexed beamlets. While the example implementation discussed herein utilize 30 spatiotemporal multiplexed beamlets, other implementations may be configured to utilize a different number of beamlets. Each voxel in a MAxiMuM data set corresponds to a single beamlet or bead, thereby maximizing signal-to-noise ratio while minimizing heat penalty.

In conventional volumetric scanning 2p microscopes without MAxiMuM, the laser may have a relatively slow repetition rate, which could result in dead time between voxels. For example, if the laser has a repetition rate of 4.68 MHz, which may result in approximately 214 ns of dead time between voxels. To address this technical problem, MAxiMuM provides a spatiotemporal multiplexing module is provided to split a single pulse from the laser into multiple beamlets which are each delayed such that they may be equally spaced in time across a time window. For example, the spatiotemporal multiplexing module may be configured to split a single pulse of the laser into 30 beamlets and to delay each beamlet such that the beamlets are equally spaced in time across the 214 ns window for the laser having a 4.68 MHz repetition rate. The number of beamlets and the size of time window may vary depending upon the implementation. Additionally, each beamlet is given a different divergence during the splitting process to focus each beamlet to a different axial plane of the sample. A technical benefit of this approach is that, based on the time of arrival to the detector, light resulting from excitation of the sample can be binned and re-assigned to the plane from which the light originated. This light may result from fluorescence of an indicator applied to the sample which is excited by the laser light of a beamlet. Another technical benefit of this approach is that an entire column is sampled within the time that it would have normally taken to record a single pixel laterally. Thus, the volume can be imaged at the planar frame rate of the mesoscope.

In some implementations such as the example implementation such as that shown in FIG. 1A, the multiplexing module may be based on an 8f re-imaging cavity constructed with concave mirrors and/or with a combination of flat mirrors and lenses. The round-trip time of the cavity provides temporal delay between beamlets, and an offset between the plane where the beam is re-imaged by the concave mirror pairs and the partially reflective mirror which re-injects beams back into the cavity results in an increase in divergence for each beam exiting the cavity. In one implementation, the axial offset of the cavity is configured such that the 30 beams cover an axial extent of 450 µm in tissue, corresponding to ~15 µm axial sampling. An example implementation of the multiplexing module is discussed below with respect to FIG. 1A.

FIG. 1A is a diagram of an example implementation of a spatiotemporal multiplexing module 100 that may be used to implement MAxiMuM. In FIG. 1A, 'Ms' denote mirrors, Is' denote lenses, and 'HWP' denotes a half-wave plate.

The cavity of the spatiotemporal multiplexing module 100 reimages the focused beam from a pulsed laser source using four concave mirrors. A partially reflective mirror (PRM) may be used before the cavity to reflect the majority of light back into the cavity for the subsequent round trips while the chosen fraction of the light (also referred to herein as a "beamlet") is coupled out of the cavity and sent towards the microscope. Each roundtrip introduces a lateral offset Δx and an axial offset Δz, and a temporal offset Δt for each successive beam. The relative pulse energy for each beamlet may be set by adjusting the splitting ratio of the PRM.

The beam propagates a distance Δz from the nominal focal plane before encountering a partially reflective mirror. The reflected portion is reintroduced into the cavity and for each successive round-trip experiences an extra axial shift Δz and a relative temporal delay τ. Accordingly, the beams transmitted out of the cavity have distinct axial focal points ($z_1, z_2, \ldots z_{30}$) and distinct temporal delays ($t_1, t_2, \ldots t_{30}$). To be incident on the partially reflective mirror after the first roundtrip, spatiotemporal multiplexing module 100 also imparts a small lateral shift as well, resulting in slight tilt to the light column and a total lateral separation of <200 μm between the top and bottom beads in the sample.

The introduced focal offset between each beam allows their focusing to depths in the sample with a relative decrease in optical power for the $i^{th}$ given by $P_i=T(1-T)^i$, with T the transmission of the PRM while the size and geometry of the cavity allows for the temporal separation of sub-pulses to be adjusted to fulfill the fluorescence lifetime limited principle. The above equation shows that T can be chosen to match the exponential power change to the specific scattering length of the imaged tissue. A technical benefit of this approach is that it provides a flexible means for adjusting the power such that the power increases in subsequent light beads as a function of sample depth and independently the axial separation of the light beads in the scattering sample. An example implementation of MAxiMuM using a mirror with T~8% allows the generation of 30 temporally multiplexed beams, such as those shown in the example implementation of FIG. 1A.

One of the technical benefits of the MAxiMuM techniques provided herein, is that it allows for a decoupling of the number of axially multiplexed beams and the sample-specific needs to adjust the power as a function of depth in order to maintain a constant SNR. A technical benefit of this versatility is that MAxiMuM enables the realization of sampling conditions at different densities and axial imaging ranges within the same sample which in turn enables the realization of imaging modalities with different applications. More specifically, this decoupling allows the axial separation between the foci of two sequential beams in the sample, δz, to be freely chosen by fulfilling $δz=-l_s \ln(1-T)$ with $δz=Δz/M^2$ where M is the magnification of the microscope and Δz the axial separation of beams exiting the cavity. This degree of freedom together with the lateral voxel spacing given by the laser repetition rate, the resonant scanner frequency, the optical design of the system and the flexibility to choose size of the PSF allows the effective realization of different imaging modalities aimed at large-scale cellular-resolution volumetric recording, synaptic resolution volumetric recording of dendrites and axonal processes and volumetric cellular resolution imaging at up to ~400 Hz and beyond, which opens up applications of our approach to volumetric voltage imaging of genetically encoded voltage indicators (GEVIs).

The spatiotemporal multiplexing module 100 may be implemented as a standalone module that is disposed between a laser source and a microscope where the spatiotemporal multiplexing module 100 performs sequential re-imaging of the beam waist at the entrance of the spatiotemporal multiplexing module 100. As a result, the spatiotemporal multiplexing module 100 may be combined with existing 2 pM systems. By using appropriately selected cavity parameters and telescopes in addition to the demultiplexed detection, existing 2 pMs can be converted to fast volumetric Ca2+ imaging platforms with desired spatiotemporal resolution for different neurobiological applications provided that the laser source can produce sufficient pulse energies. Thereby, the spatiotemporal multiplexing module 100 addresses the inherent tradeoffs between volume acquisition rate, voxel spacing, and resolution within the limits of sample exposure to laser light in the most efficient manner irrespective of which parameter is optimized.

In the example implementation of the spatiotemporal multiplexing module 100 includes a cavity 110 that includes concave mirrors configured in an 8f, non-inverting, re-imaging scheme. However, other implementations may utilize a combination of flat mirrors and lenses to replace some or all of the concave mirrors. An input beam 120 is focused by lens L1, which is disposed above the aperture of the output coupler M1 and in front focal plane of the mirror M2. The mirrors M2, M3, M4, and M5 are concave mirrors with custom low-dispersion dielectric coatings. The mirrors M2, M3, M4, and M5 reimage the initial spot of the laser pulse onto the turning mirror M6. The mirror M6 provides a slight vertical tilt to the beam such that it intersects the output coupler M1. The output coupler M1 is a low dispersion ultrafast beam splitter. The majority of the light incident on the output coupler M1 undergoes another round-trip through the cavity 110, and the rest of the light is output by the cavity 110. In implementations that include the optional cavity 115, the light output by cavity 110 is transmitted to cavity 115. Thus, a "beamlet" is split off from the laser light incident on the output coupler M1 and output from the cavity 110, while the remainder of the light incident on the output coupler M1 makes another round trip of the cavity 110.

Each round trip through the cavity 110 provides a temporal delay as well as an offset in the focal plane of the beam dictated by the distance between the mirror M6 and the output coupler M1. In the example shown in FIG. 1A, the temporal delay τ may be represented by the equation τ=8f/c. The angle of the mirror M6 ensures that the beam 120 intersects the aperture of the output coupler M1 and causes a small lateral offset between subsequent round trips of the cavity 110. This offset is minimized during alignment to reduce offset between axial planes in the sample. FIG. 1A shows an example beam profile 125 that represents a simulation of a beam profile exiting the cavity 110.

Figure 1B:
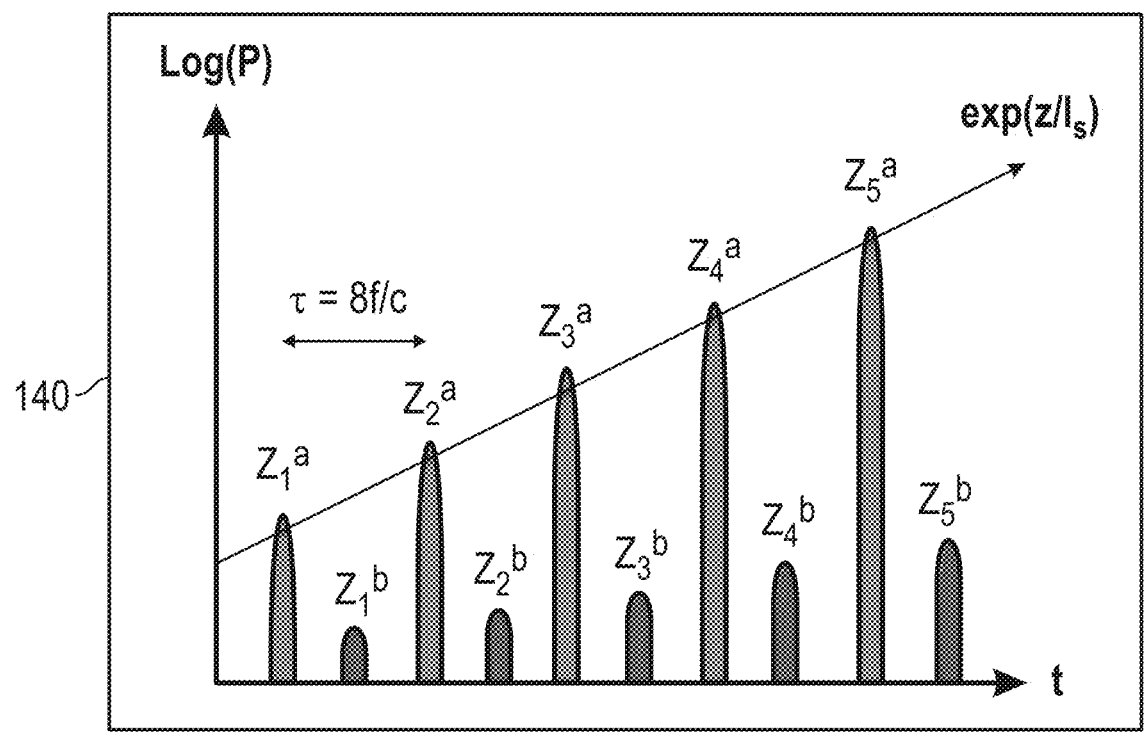
FIG. 1B is a temporal schematic of pulses from the two sub-volumes each associated with a separate cavity of the spatiotemporal multiplexing module of the multiplexing module of FIG. 1A.

The non-zero transmission of the output coupler M1 also causes the beams emitted from the cavity 110 to fall off in optical power exponentially according to the splitting ratio of M1. It is well known that scattering in brain tissue requires an increase in imaging power to preserve signal to noise ratio at increasing tissue depths. Accordingly, the spatiotemporal multiplexing module 100 can finely tune the rate of decrease in power between subsequent beams focused to different axial depths in the sample by manipulating the splitting ratio of the mirror M1 in order to match the expected scattering properties of the tissue or other sample. Therefore, by orienting the least-powerful beams towards the shallowest depths in the sample to be scanned, the spatiotemporal multiplexing module 100 facilitates volumetric imaging without the need for active adjustment of the imaging power as shown in the chart 140 of FIG. 1B. Chart 140 is a temporal schematic of pulses from cavity 110 and cavity 115. The pulses from cavity 110 are represented by $z_1^a$-$z_5^a$ and the pulses from cavity 110 are represented by $z_1^b$-$z_5^b$. Due to the shorter delay of cavity 115 relative to cavity 110, the pulse trains from cavity 110 and cavity 115 are interleaved. The pulse energies for each beam decreases exponentially according to the transmission/reflection ratio of mirror M1, a partially transmissive mirror (PRM) in cavity 110. The transmission/reflection ratio may be adjusted to control the pulse energy drop off of the individual beamlets. For brain tissues, exponential decrease may be matched to the expected scattering length (ls) for brain tissue (~200 μm). The exponential decrease may be matched to the expected scattering length for other types of samples. Power of the pulses from cavity 115 is lower than those from cavity 110 since cavity 115 pulses are sent to more superficial layers in the sample. The offset can be controlled by the HWP in cavity 110.

In example implementation of the spatiotemporal multiplexing module 100 used for 2 pM where the sample comprises brain tissue, excitation power must increase exponentially with depth in order to preserve signal-to-raise ratio in the presence of tissue scattering. The spatiotemporal multiplexing module 100 is configured such that the pulse energy for beams exiting the cavity fall off according to an exponential decay chosen by optimizing the partial reflectivity of the output coupler M1. Using a reflectivity of R=10% allows for a fall-off of pulse energy that matches the scattering length of brain tissue ($l_s$~200 μm), such that the signal-to-noise ratio from each light bead is conserved and maximized across all depths within the column for the total delivered pulse energy. A series of relay telescopes may be used to couple the light beads into a mesoscopy platform such that the center of the light bead column is conjugated to the nominal focal plane of the objective.

Figure 5:
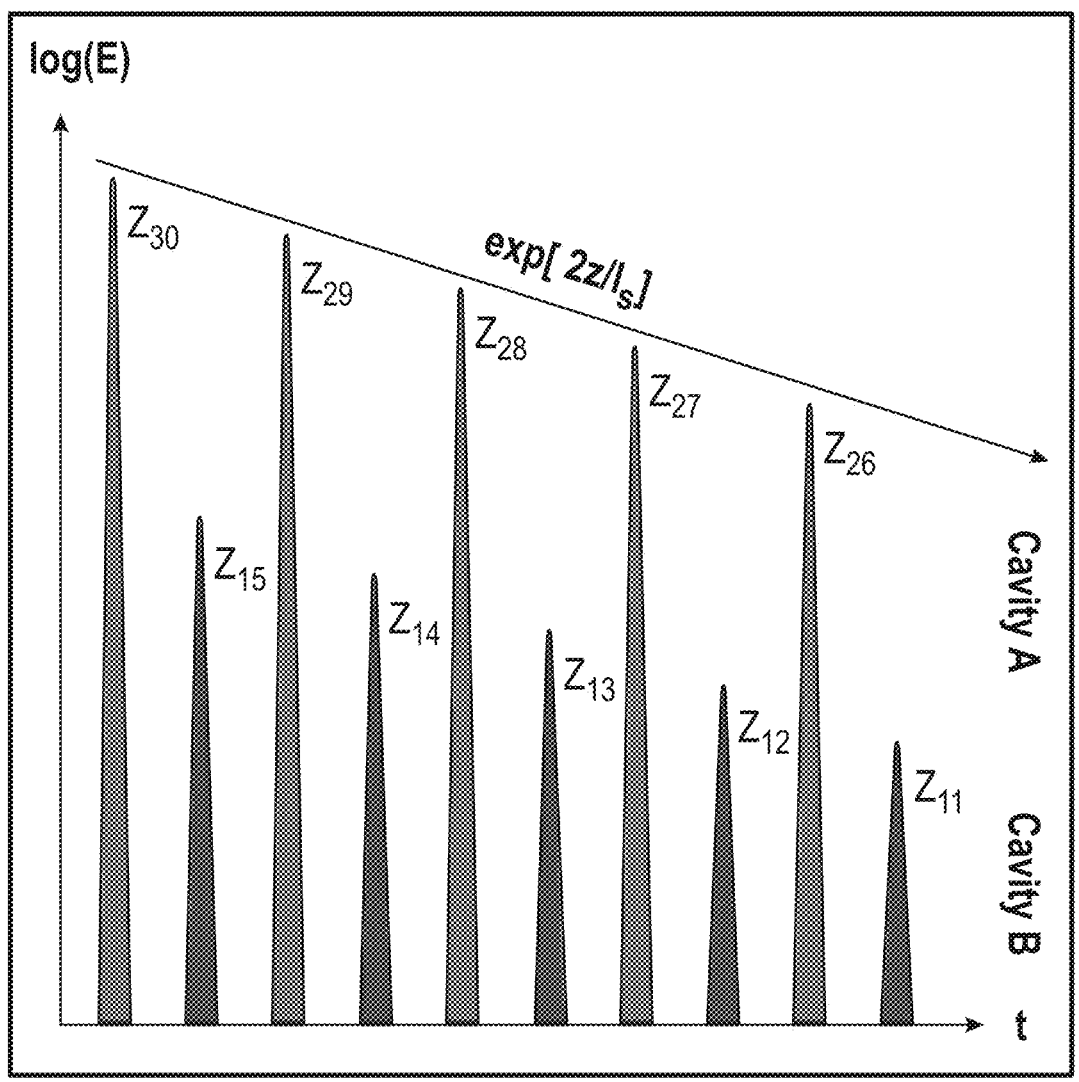
FIG. 5 is a temporal schematic and schematic of the relative pulse energies of pulses from the two sub-volumes of the multiplexing module of FIG. 1A.

FIG. 5 is a temporal schematic of pulses from cavity 110 and cavity 115. Due to the shorter delay of cavity 115 relative to 110, the pulse trains are interleaved. The pulse energies for each beam decreases exponentially due to the partially transmissive mirror in cavity 110. Exponential decrease is matched to the expected scattering length ($l_s$) for brain tissue (~200 μm). Power for cavity 115 pulses is lower than those from cavity 110 since cavity 115 pulses are sent to more superficial layers in the brain. The offset may be controlled by the HWP in cavity 110.

The light exiting cavity 110 is recollimated by the lens L2. L2 may be implemented using an achromatic doublet. The lenses L3 and L4 form a unitary magnification telescope which may ensure that the lowest power beams were directed to the shallowest depths in a sample. In the example implementation shown in FIG. 1A, the lenses F3 and F4 have a focal length of 100 mm and may be implemented using an achromatic doublet. In other implementations, the lenses F3 and F4 may have a different focal length or could be realized by using curved mirrors.

The beams are transmitted through a half-wave plate (HWP) and onto a polarizing beam splitter (PBS) of cavity 115. The reflected portion of the beam undergoes a single round-trip through another custom-mirror-based 8f re-imaging cavity 115 before being re-combined with the transmitted portion of the beam as shown in FIG. 1A. In the example implementation shown in FIG. 1A, the mirrors M9, M10, M11, and M12 may have a focal length of 250 mm and 2-inch diameter. Other realizations using flat mirrors and lenses is also possible. Cavity 115 includes mirrors having a shorter focal length than the mirrors in cavity 110 mirrors to create a copy of the 15 pulses from cavity 110 and shift them in time and axial location to achieve the full 30 beams and 465 μm axial range of the MAxiMuM system.

Figure 1C:
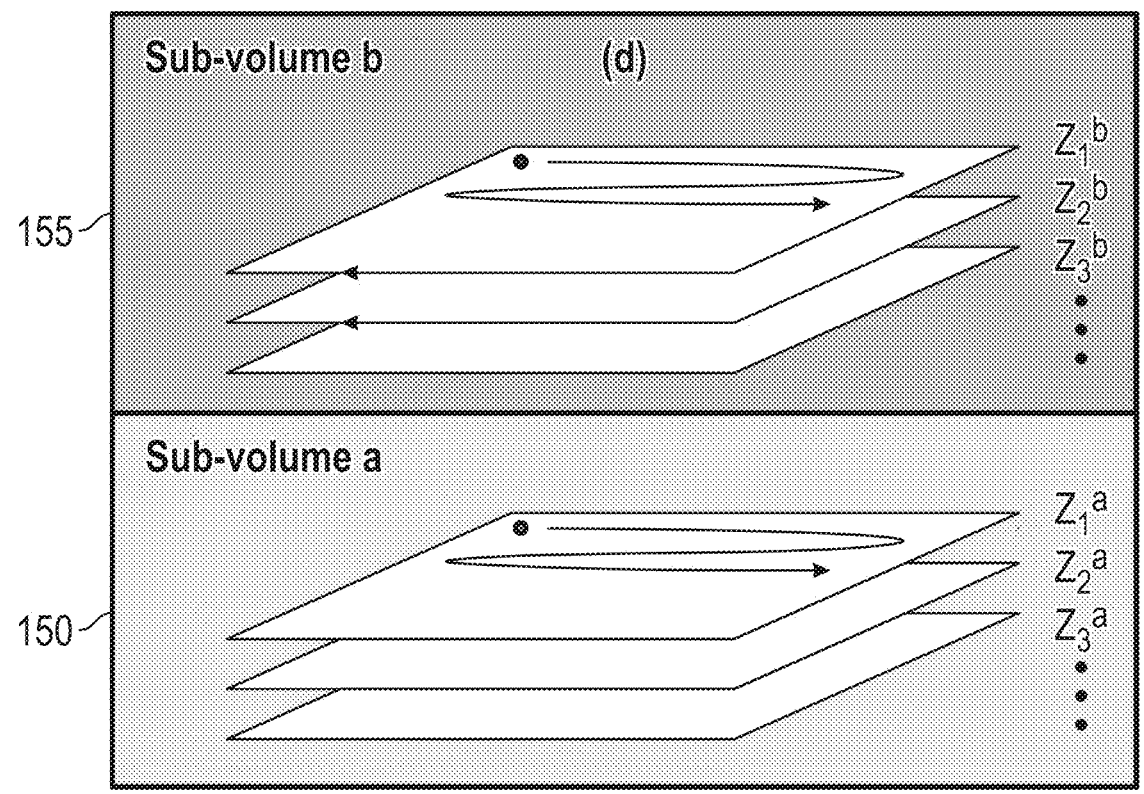
FIG. 1C is a diagram showing the two sub-volumes of MAxiMuM that are spatially separated along the optical axis and a scanning scheme that may be used in 2p microscopy for scanning those two sub-volumes.

The beams coupled to the secondary cavity 115 are delayed an additional 6.67 ns in the example shown in FIG. 1A, interleaving the beams in time with the beams transmitted by the PBS. The focal planes of these delayed beams can be globally shifted by adjusting the position of the mirrors M9 and mirrors M11, forming two sub-volumes 150 and 155 that are spatially separated along the optical axis as shown in FIG. 1C. The cavities 110 and 115 together form the two sub-volumes 150 and 155 such that the planes from cavity 110 are below those of cavity 115 so that together the two sub-volumes 150 and 155 can sample the entire axial range of a volume of the sample. Manipulation of the HWP can be used to adjust the relative optical power of the sub-volumes in order to preserve matching to the scattering properties of the tissue. In the example implementation shown in FIG. 1A, thirty spatiotemporally multiplexed beams exit the secondary cavity 115, and the axial separation between imaging planes is ~15 μm in this example.

MAxiMuM provides a significant technical benefit through its arbitrarily large and scalable degree of multiplexing that results in eliminating the need for any axial scanning in the volume. The degree of multiplexing provided is scalable through careful design of the primary and secondary cavities 110 and 115 and through careful tuning of the inter-cavity dispersion and output leakage. The example implementation showing in FIG. 1A samples a 450 μm axial range with 15 μm axial width voxels using 30×multiplexing, with the number of beams limited primarily by the temporal response of the photo-multiplier tubes (PMTs) and by tissue heating. Outside these practical limitations, the design form could be applied to even higher degrees of multiplexing, to increase the axial range or sample with higher resolution.

Figure 1D:
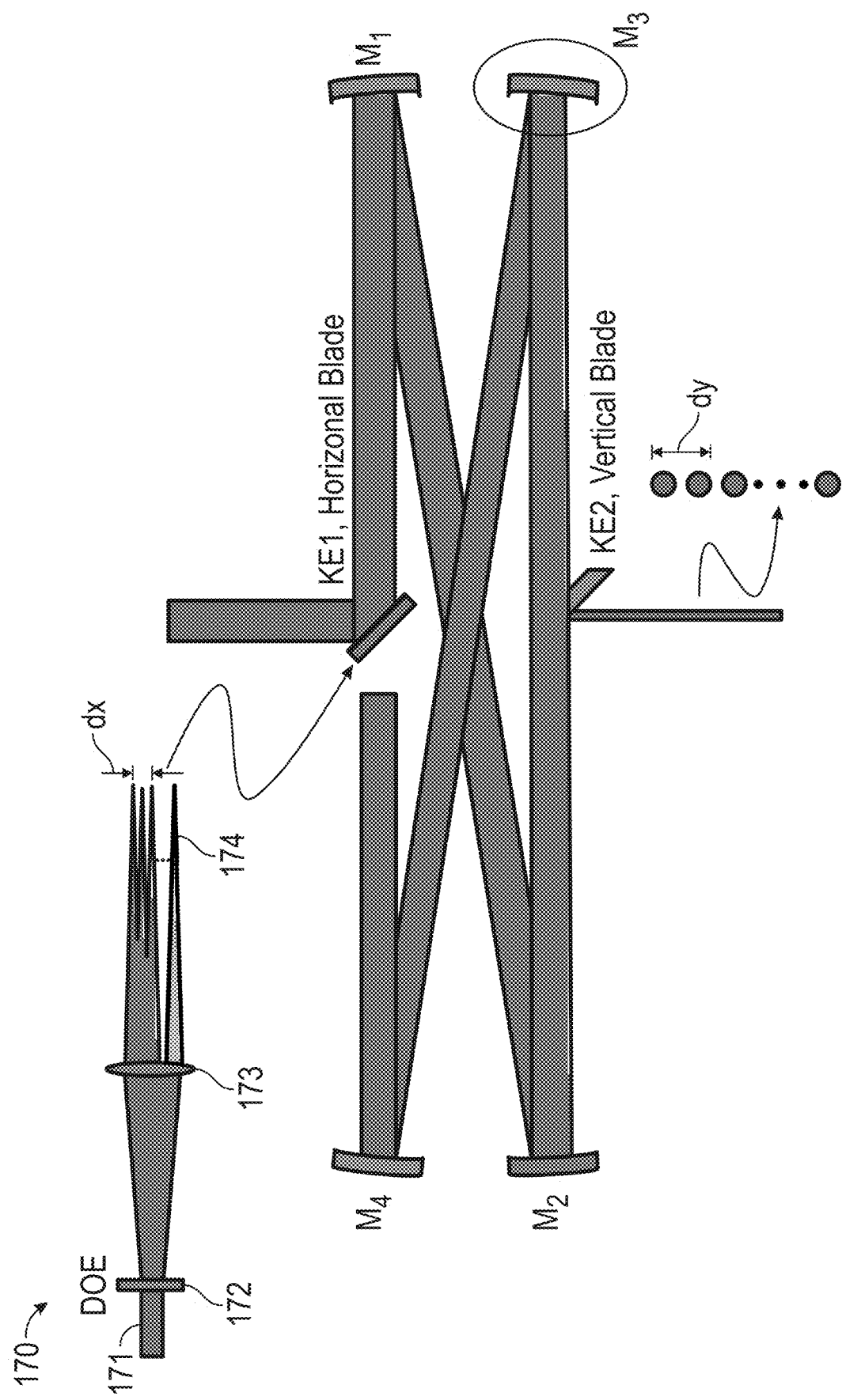
FIG. 1D is a diagram showing an example implementation of a lateral spatiotemporal multiplexing module.

FIG. 1D is a diagram showing an example implementation of a lateral spatiotemporal multiplexing module 170. In contrast with the examples shown in FIGS. 1A and 1C, the lateral spatiotemporal multiplexing module 170 is configured to provide lateral spatiotemporal multiplexing rather than the axial multiplexing provided by the spatiotemporal multiplexing module 100. In FIG. 1D, 'Ms' denote mirrors, ls' denote lenses, 'DOE' denotes a diffractive optical element, and 'KEs' denote knife edge mirrors. The lateral multiplexing module 170 includes mirrors M1, M2, M3, and M4 which are curved mirrors. KE1 is a horizontal blade knife edge mirror and KE2 is a vertical blade knife edge mirror.

A laser beam input 170 may be received from a pulsed laser source as in the preceding examples of the axial multiplexing module. The DOE 172 diffracts the laser beam input 170 onto the lens 173, which focuses the laser beam input into a plurality of beamlets 174. The lateral spatiotemporal multiplexing module 170 shown in FIG. 1D includes the DOE 172 for splitting the laser beam input 174 into a plurality of beamlets. However, other implementations may include other beam splitting elements for separating the laser beam input 170 into the plurality of beamlets 174.

The beamlets 174 move horizontally by Δx and vertically by Δy for each round trip around the re-imaging cavity of the lateral multiplexing module 170. KE2 picks off a new beamlet to be output from the lateral multiplexing module 170 for each round trip around the cavity. The values of Δy is configurable to cause the beamlets to be distributed laterally. The beamlets output by the lateral spatiotemporal multiplexing module 170 may be used to sample laterally along the same axial plane of the sample in contrast with the examples shown in FIG. 1C in which the spatiotemporal multiplexing module 100 produces axially separated beamlets across multiple axial planes. The specific delay associated with each beamlet may be configured in a similar manner as the delay associated with the beamlets in the spatiotemporal multiplexing module 100. The delay associated with each beamlet is generated based on a number of round trips that the beamlet makes around the re-imaging cavity of the lateral multiplexing module 170.

Light Beads Microscopy

Light Beads Microscopy (LBM) may use a spatiotemporal multiplexer, such as but not limited to the MAxiMuM spatiotemporal multiplexing module 100 or the c-MAM 601, to facilitate volumetric recording of a sample. The examples which follow apply LBM to recording neuroactivity in brain tissue. LBM enables near-simultaneous in-vivo volumetric recording of >807,748 neurons at single-cell resolution in the mouse cortex. The LBM techniques presented herein provide a technical solution to the technical problem of recording neuroactivity in a volumetric fashion at physiological time scales and at a cellular resolution. However, the LBM techniques disclosed herein are not limited to studying neuroactivity in brain tissue. The LBM techniques may be applied to study objects of interest and/or activity of interest within volumes of organic and/or inorganic samples.

The LBM techniques described herein provide a technical solution in which information is acquired from sample voxels at the maximum possible rate, limited only by fluorescence lifetime, while minimizing the laser-induced heat penalty per unit generated signal, and spatially sampling features of interest, such as cell bodies, as efficiently as possible. The LBM techniques are not limited to calcium image and may be applied to other imaging techniques such as but not limited to volumetric voltage imaging of genetically encoded voltage indicators (GEVIs).

Figure 2:
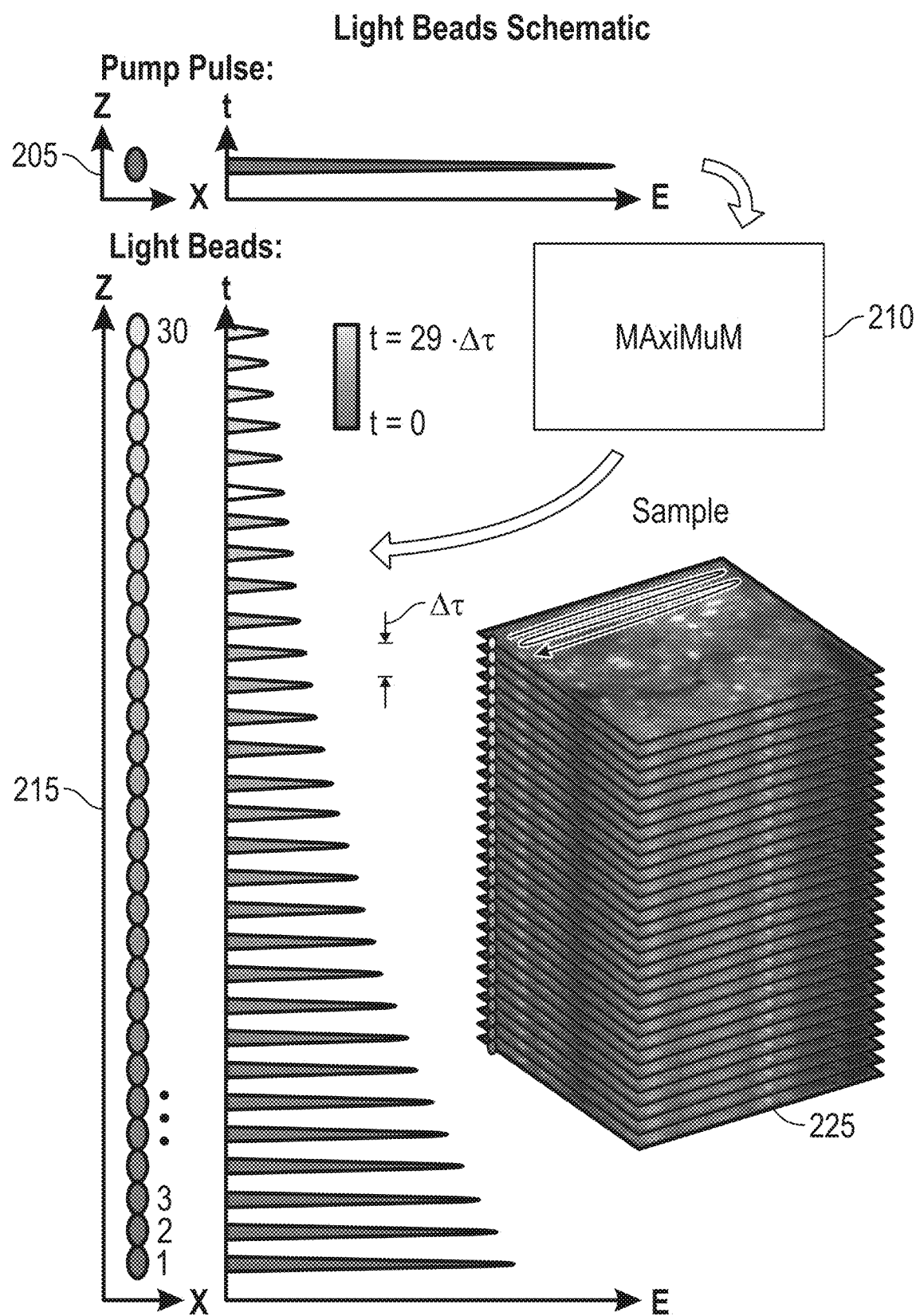
FIG. 2 is a diagram depicting elements of Light Beads Microscopy which may use MAxiMuM shown in FIG. 1A.

FIG. 2 is a diagram showing various aspects of LBM which uses MAxiMuM to generate light beads. LBM is a scalable high-speed optical acquisition technique that provides a voxel acquisition rate of more than 140 MHz. In LBM, the microscope scans a set of axially separated and temporally distinct foci (also referred to herein as "light beads" 215) as opposed to a single spot 205 as shown in FIG. 2. The beads record information throughout the entire depth of the sample at the same, if not a higher, rate than a typical microscope records a single voxel. Thus, LBM can obtain the entire volume at the same rate as a conventional microscope records a single plane, which eliminates the need for additional axial scanning. The LBM techniques may use various spatiotemporal multiplexing techniques to form the light beads, such as but not limited to the MAxiMuM spatiotemporal multiplexing module 100 or the c-MAM 601.

In the example shown in FIG. 2A, MAxiMuM 210 may be implemented by the spatiotemporal multiplexing module 100 shown in FIG. 1A. MAxiMuM 210 may be configured to generate ~500 μm long columns composed of 30 axially and temporally distinct focused beams in this example implementation. Other implementations may be configured to generate columns having a different length and/or that include a different number of temporally distinct focused beams. LBM has been realized on a mesoscopy platform that allows access to a lateral field of view (FOV) of ~6×6 mm2 at subcellular resolution (NA=0.6), demonstrating volumetric and single-cell resolution recording from volumes of ~3×5×0.5 mm3, encompassing portions of the primary visual (VISp), primary somatosensory (SSp), posterior parietal (PTLp), and retrosplenial (RSP) areas of GCaMP6s-labeled mouse neocortex at ~5 Hz volume rate. The versatility of LBM on this mesoscopy platform has been demonstrated by recording in a variety of configurations ranging from moderately sized FOVs (600×600×500 μm3) with voxel resolution capable of resolving subcellular features, to FOVs (5.4×6×0.5 mm3) encompassing both hemispheres of the mouse cortex and capturing the dynamics of populations exceeding 800,000 neurons.

LBM provides an optical recording system that offers an acquisition bandwidth limited only by the properties of the molecular sensors, while inducing minimal heating of the tissue or other sample per unit generated fluorescence. To achieve this in densely labeled brain tissue without a priori information about the sample or any post-imaging reconstruction, LBM employs a high degree of spatiotemporal multiplexing along the axial dimension. Multiplexing is facilitated by splitting a single highly energetic pump pulse into many sub-pulses. Each sub-pulse undergoes a differing amount of free-space propagation prior to entering the microscope, causing relative temporal delays between adjacent pulses that exceed the fluorescence lifetime of the indicator. The sub-pulses are arranged into a column of light beads 215, and focused to different planes 225 in the sample, such that each voxel in the volume is sampled by a single laser pulse. This approach maximizes signal-to-noise ratio and increases the extracted information rate to the limit posed by the fluorescence lifetime and the detector response time. By scanning the column of light beads 215 over the transverse plane, a volumetric image can be formed at the nominal frame rate of the microscope. As the light beads 215 are both temporally and spatially distinct, the fluorescence emitted from each bead can be recorded with the same single-point detector, and the detection time of the fluorescence can be used to determine the location of each voxel in three-dimensional sample space.

The column of light beads is formed using a spatiotemporal multiplexing module, such as but not limited to the spatiotemporal multiplexing module 100 or the c-MAM 601. The spatiotemporal multiplexing module output a set of beamlets having distinct axial or lateral focal points. The relative pulse energy for each beamlet may be set by adjusting the splitting ratio of the PRM.

When 2 pM is used in scattering media, excitation power must increase exponentially with depth in order to preserve signal-to-raise ratio in the presence of tissue scattering. The spatiotemporal multiplexing module 100 is configured such that the pulse energy for beams exiting the cavity fall off according to an exponential decay chosen by optimizing the partial reflectivity of the output coupler M1. Using a reflectivity of R=10% allows for a fall-off of pulse energy that matches the scattering length of brain tissue ($l_s$~200 μm), such that the signal-to-noise ratio from each light bead is conserved and maximized across all depths within the column for the total delivered pulse energy. Lastly, a series of relay telescopes are used to couple the light beads into our mesoscopy platform such that the center of the light bead column is conjugated to the nominal focal plane of the objective.

Figure 3:
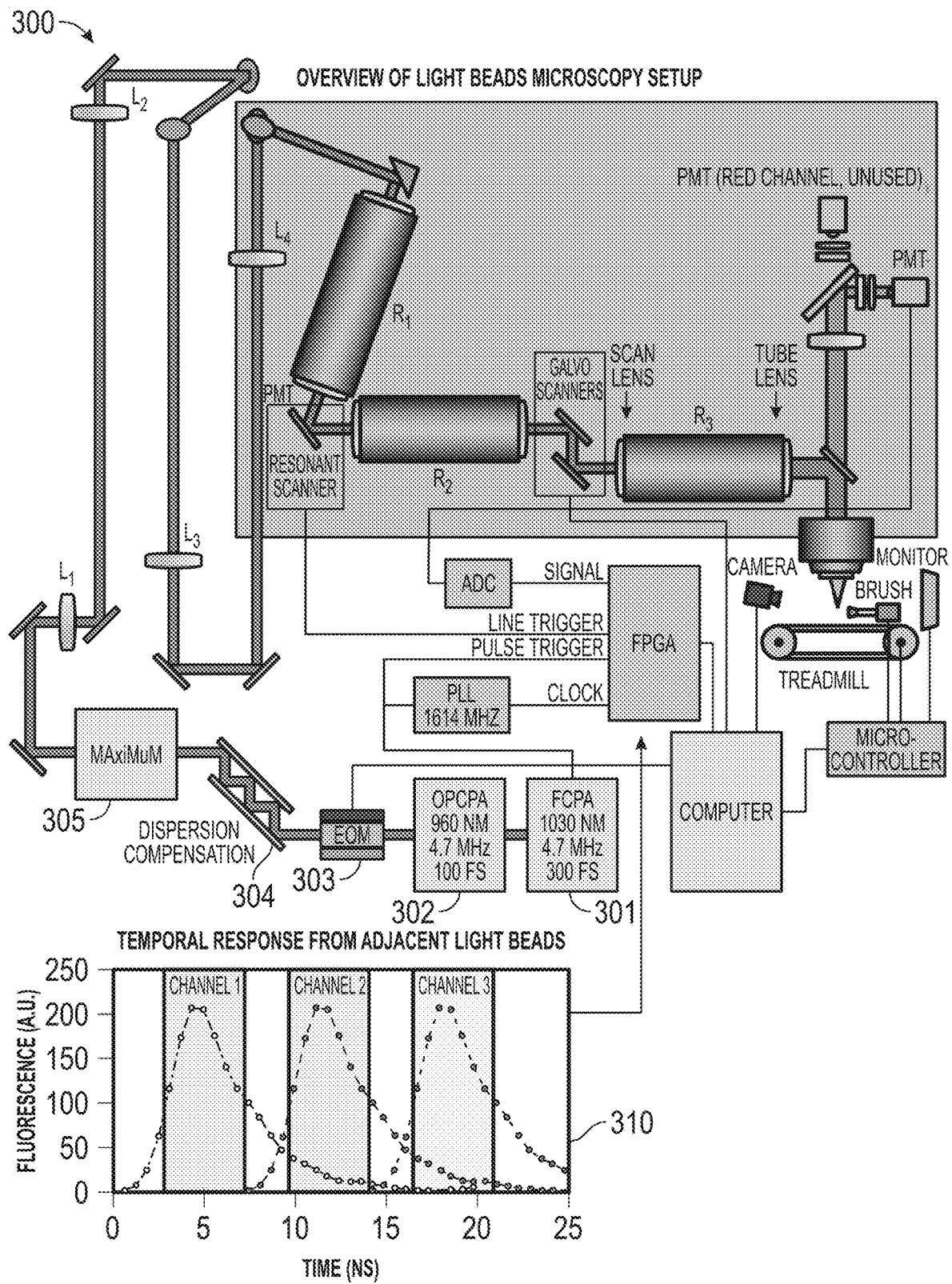
FIG. 3 is a diagram of an example microscopy setup in which MAxiMuM in integrated with a mesoscope.

Integration with mesoscope: The output of the multiplexing module was interfaced with a commercial mesoscope. An example mesoscope layout and accompanying electronics are shown in FIG. 3. FIG. 3 is a diagram providing an example mesoscopic system 300. The mesoscopic system 300 includes a fiber chirped-pulse amplifier (FCPA) 301 which emits the pulsed laser beam, which passes through the optical parametric chirped-pulse amplifier (OPCPA) 302 followed by the electro-optic modulator (EOM) 303, the dispersion compensation path 304, MAxiMuM 305, and into the microscope. Is' denote lenses, 'Rs' denote relay lens pairs, 'PMT' denotes photo-multiplier tube, 'ADC' denotes analog to digital converter, and 'PLL' denotes phase-locked loop. The channel plot 310 shows channel allocation for demultiplexing on the Field Programmable Gate Array (FPGA). Data points are the measured impulse response for fluorescence from GCaMP6f measured with our PMT and associated electronics, captured with 1614 MHz (0.62 ps) resolution. Shaded regions denote the integration boundaries for each demultiplexed channel.

Figure 4A:
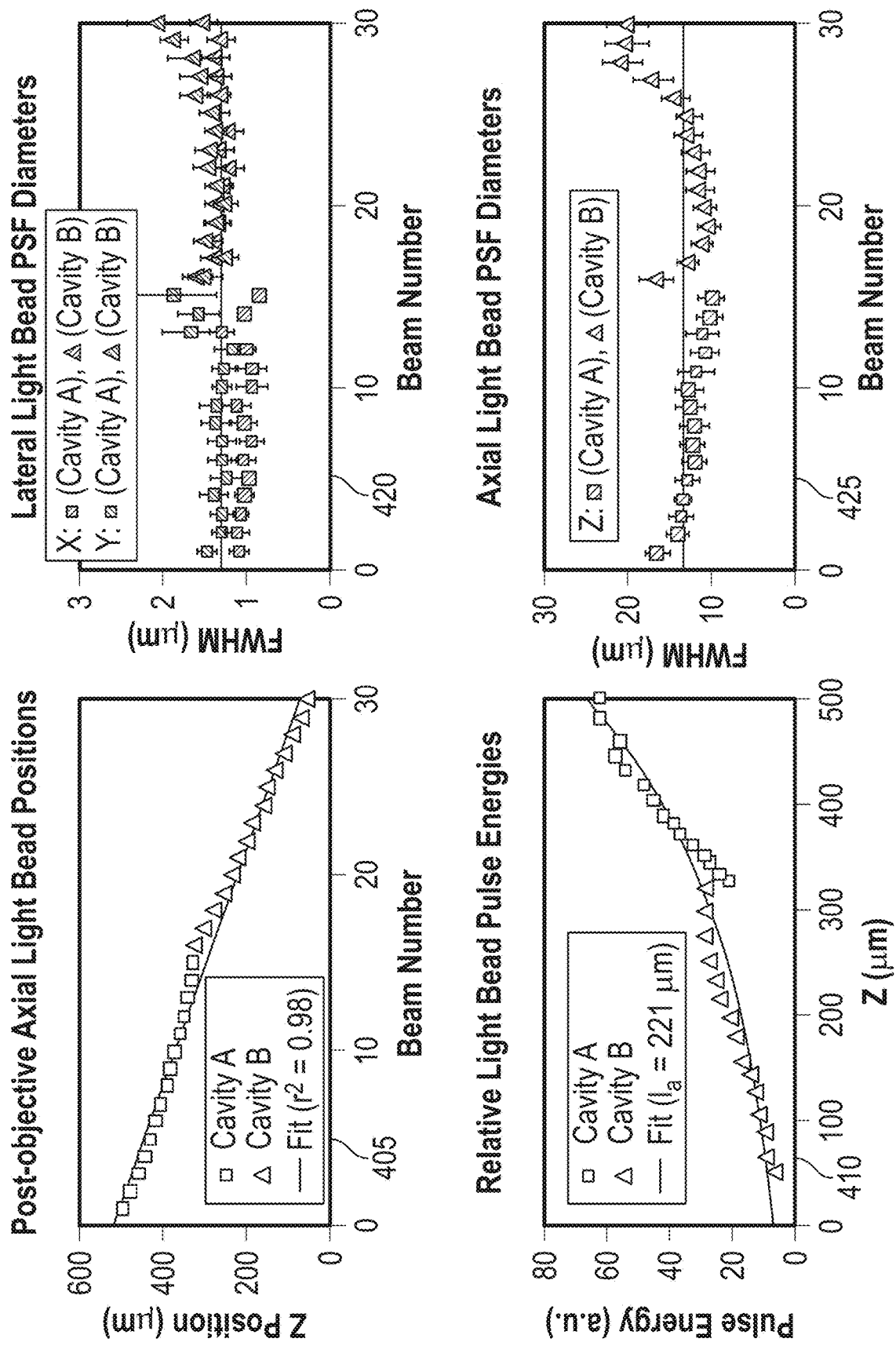
FIGS. 4A and 4B present a set of charts that present information related to post-object calibration.
Figure 4B:
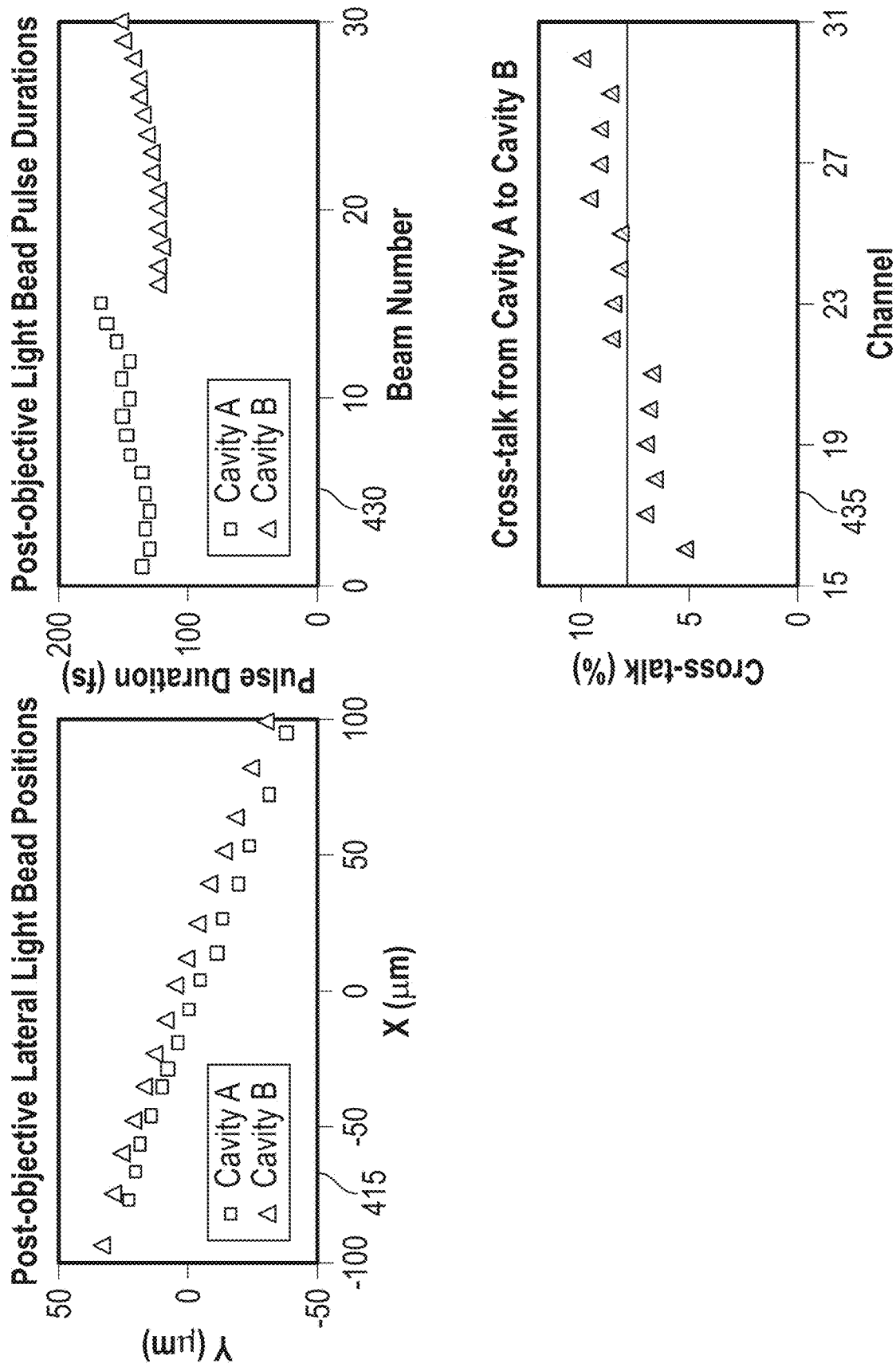

MAxiMuM post-objective calibration: FIG. 4 presents a set of charts that present information related to post-object calibration. Charts 405, 410, and 415 are charts relating to axial light bead positions, relative light bead pulse energy, and transverse position of the light beads, respectively, calibrated by translating a pollen grain through the focus of the microscope. Chart 420 presents lateral point-spread function full-width and half-maximum diameters for each light beam. The horizontal line across chart 420 represents the mean value. Error bars denote the 95% confidence interval values for the Gaussian fits used to determine PSF widths. Chart 425 presents axial point-spread function full-width at half-maximum diameters for each light bead. The horizontal line across chart 425 represents the mean value. Error bars denote the 95% confidence interval values for the Lorentzian fits used to determine PSF widths. Chart 430 presents pulse duration measurements of each beam from MAxiMuM, post-objective. Chart 435 presents measurements of crosstalk between demultiplexed channels. The black horizontal line on chart 435 shows the mean value.

Chart 405 shows a calibration of the relative axial focal position for each beam post-objective, achieved by recording fluorescence signal from a grain of pollen (~20 µm diameter) translated through the focus of the objective by a piezo stage. The offset between axial foci of the beams is linear ($r^2=0.98$) over the 30 beams. Additionally, by tracking the maximum time-averaged signal from a pollen grain measured at the nominal focal plane of each beam, the power in each plane was calibrated (chart 410). The power measurements were fit with an exponential curve, finding that the effective scattering length (ls=220 µm) matched the expectation for the sample (ls~200 µm) reasonably well. Pollen grain measurements were also used to determine the lateral offset between the beams (chart 415) which corresponded to less than 200 µm total shift across the axial range.

The point spread function (PSF) for each beam was also recorded using a 1 µm diameter fluorescent bead. The measured full-width-at-half-maximum (FWHM) diameter for the PSF of each beam is shown for the lateral and axial dimensions in charts 420 and 425, respectively. The measured axial widths ensure that for the given separation between axial planes (~15 µm) and typical neuron sizes (10-20 µm), the probability of detecting any neurons present is high, while the likelihood of the PSF intersecting two neurons simultaneously (thus rendering them indistinguishable) is negligibly low. The average lateral FWHM is 1.3 µm, which when deconvolved (assuming a step function with 1 µm width as a model for the fluorescent bead) yields an average PSF diameter of 1.1 µm.

Care was taken to minimize the inter-cavity dispersion for MAxiMuM. While dispersion accumulation throughout the microscope is inevitable and can be compensated, any dispersion within the cavity would lead to variation of the individual pulse duration of each beam exiting MAxiMuM. Accordingly, the cavity was designed with entirely reflective components and used low-dispersion dielectric coatings for as many components as possible. Chart 430 shows the post-objective pulse durations measured by auto-correlation for each of the 30 beams, measured using APE pulseCheck autocorrelator. While the pulse duration (120-160 fs) is not transform-limited (~90 fs) for each beam after the objective, the degradation is acceptably small and can be accounted for by adjusting the power of each beam through optimization of the output coupling from the cavity.

Crosstalk analysis: A crucial element of the spatiotemporal multiplexing scheme employed here is that signal from the beams is distinguishable in time in order to effectively demultiplex and assign signal to the proper axial location. Any leakage of the signal from one beam to the time slot of another will lead to distortion of the volume, typically referred to as crosstalk. Crosstalk in the system estimation was measured by recording mouse brain tissue in vivo with 30× multiplexing enabled, but with the beams in cavity 115 (FIG. 1A) blocked. As shown in the channel plots 310 inset in FIG. 3, the fluorescence response from a single voxel has an exponential tail that inevitably extends to some degree into the signal from the subsequent voxel. The fraction of residual signal generated by the beams from cavity 110, recorded at time values allocated for beams from cavity 115, indicates the crosstalk for the system. As shown in chart 435 of FIG. 4, the crosstalk is fairly channel-invariant, and the average value (7%) is largely negligible. Crosstalk is a linear mixing phenomenon and can be removed post-recording if the contributions from each channel are known a priori.

Data acquisition: Data was acquired using the commercial mesoscope-compatible version of the ScanImage software platform (Vidrio, Inc.) with necessary additional customizations, as well as upgraded digitization hardware (FIG. 4, chart 405). An evaluation board was used to multiply a trigger signal from the OPCPA laser to 1614 MHz, which in turn was fed to the upgraded digitizer and field programmable gate array to serve as a sample clock. This clock signal was used within the customized version of ScanImage to synchronize the line trigger to the pulse repetition rate of the laser, thus ensuring a single laser pulse constituted one voxel of the recording.

Additionally, the ScanImage customization allowed the user to define channels by integrating temporal windows of the raw PMT signal with respect to a trigger from the laser. The window for each channel was set to integrate the fluorescence signal associated with each beam from the MAxiMuM system such that the channels constitute the de-multiplexed axial planes of the volumetric recording (channel plots 310 in FIG. 3). The microscope recorded frames for each channel separately, in the same fashion as a two-color compatible microscope records separate channels from each PMT. The data streamed to disk consisted of 30 consecutive frames representing each channel, and thus each axial plane, repeated in sequence for each time point in the measurement.

Co-Linear Many-Fold Axial Multiplexing (c-MAM)

c-MAM builds upon the MAxiMuM spatiotemporal multiplexing module discussed in the preceding examples to provide an improved spatiotemporal multiplexing module that utilizes a co-linear geometry. As will be discussed in the examples which follow, c-MAM may be used for a versatile LBM platform that enables volumetric, cellular resolution, whole-mouse cortical recording of neuroactivity at multi-Hertz rate. For example, the c-MAM platform may be combined with a four-fold spatial multiplexer to provide for single-neuron resolution recordings from volumes as large as $7.5 \times 7.5 \times 0.6$ mm$^3$ at ~7 Hz or from a volume of ~$3.25 \times 3.25 \times 0.6$ mm$^3$ at ~28 Hz. The c-MAM platform may also implement synaptic resolution LBM capable of recording the activity of axonal and dendritic processes within a volume of ~$1 \times 1 \times 0.5$ mm$^3$ ~35 Hz as well as single cell resolution high-speed volumetric recording at ~400 Hz and beyond, which opens up new possibilities for volumetric optical voltage imaging using GEVIs. While this document references specific recording volumes in various example implementations, these examples are intended to illustrate possible configurations of c-MAM but do not limit c-MAM to these specific example configurations.

The c-MAM module provides a fully colinear spatiotemporal multiplexing module geometry that uses an active switching strategy. The modularity of the design of the c-MAM, like that of MAxiMuM, facilitates commercial adoption of the s-LBM and c-MAM module.

Figure 6A:
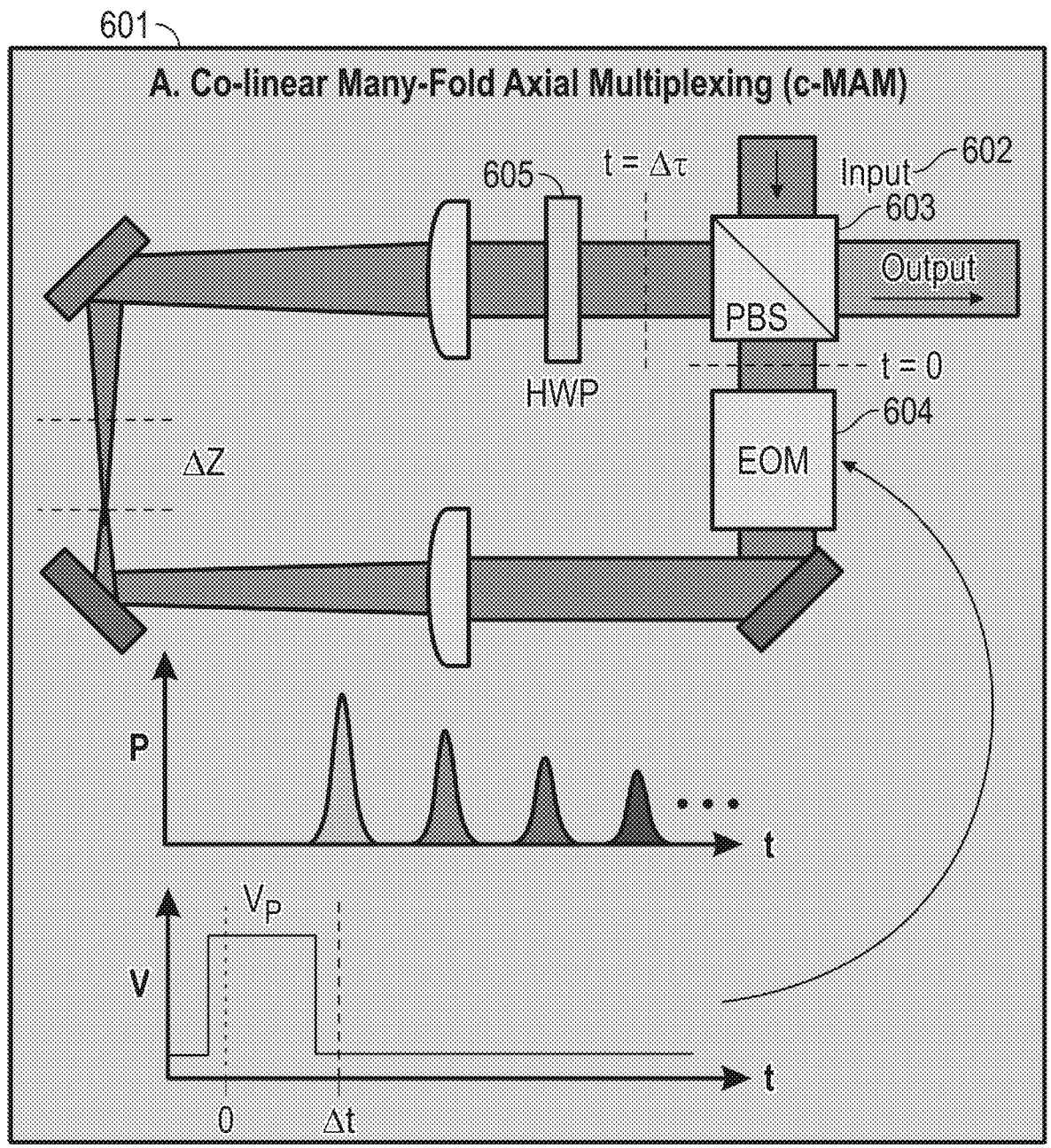
FIG. 6A is a diagram showing an example of a Co-linear Many-fold Axial Multiplexing (c-MAM).

FIG. 6A shows an example implementation of a c-MAM module 601. The c-MAM module 601 is configured to receive pulsed laser light 602 input from a pulsed laser source. The c-MAM 601 includes a half waveplate (HWP) 605 and a polarizing beam splitter (PBS) 603 are used to couple the incoming pulses into the cavity of the c-MAM 601. The PBS 605 outputs light pulses with horizontal polarization.

The c-MAM uses a fast (~200 MHz) switching electro optical modulator (EOM) 604 which rotates the plane of the polarization such that the incoming pulse is trapped inside the I-MAM cavity. The EOM 604 is "on" (i.e., V=Vp) when the beam is initially incident, converting the polarization to vertical. The EOM is "off" is then switched off until the next pulse of the beam is incident. In some implementations, the EOM module may be implemented using off-the-shelf EOM modules and customized driver electronics.

During each round trip of the pulse, the polarization of the pulse is slightly rotated as the pulse passes through the HWP 605. A portion of the pulse (a beamlet) is coupled out via the PBS 603. The overall length of the cavity (~2 m) in the implementation shown in FIG. 6A is chosen to provide the required (~6.25 ns) temporal delay between subsequent sub-pulses. Other implementations may have a different configuration to provide a different temporal delay. The temporal delay may be controlled by adjusting the distance between the mirrors and the focal point of the mirrors for curved mirrors or the focal point of the lens where a combination of lenses and flat mirrors are used to implement the c-MAM module 601.

The c-MAM 601 includes focusing mirrors that relay the beam with a slight axial offset $\Delta z$. The vertically polarized beam is primarily reflected by the PBS, reentering the EOM 604 at its "off" state (V=0), thereby trapping the pulse and allowing it to "ring down" coupling a small fraction of it (set by the HWP 605) to be coupled out. This results in a co-linear column of focused light beads separated by $\Delta z$. The c-MAM 601 may be configured to enable the pulse energy of each of the individual beamlets to be arbitrarily controlled by adjusting the angle of the HWP 605.

In the example implementation shown in FIG. 6A, the PBS 605 outputs light pulses with horizontal polarization and the EOM 604 converts the polarization of the light to vertical. However, in other implementations the PBS 605 may be configured to output light pulses with vertical polarization and the EOM 604 may be configured to convert the polarization of the light to horizontal.

c-MAM provides optimal voxel acquisition conditions that can implement a volumetric mesoscopy platform for Ca2+ imaging capable of recording unprecedentedly large volumes and at high volume speeds. For example, the c-MAM-based Light Beads Mesoscopy (LBM) Ca2+ imaging is capable of record recording ~34 mm3 at ~7 Hz when using 4×spatial multiplexing (such as that provided by spatial multiplexing module 640 shown in FIG. 6B).

The c-MAM module presented herein may be integrated with a spatial multiplexing module which provides a new mesoscopy platform that may expand the recording volume of MAxiMuM by more than 4-fold, which may allow the recording of the entire dorsal cortex of the mouse brain. For example, c-MAM may be able to record from a target v-FOV that encompasses the entire dorsal volume of the mouse cortex while maintaining single neuron resolution. The recorded volume will allow simultaneous recording from the primary motor cortex, the secondary motor cortex, the primary sensory cortex, the visual areas, the retrosplenial area, the posterior parietal and the association areas. To maintain a sufficiently high-volume acquisition rate over such a large volume, the c-MAM module may be combined with a spatial multiplexing module to generate 4 sets of c-MAM excitations each consisting of 40 temporally multiplexed light beads in the axial direction and use them to simultaneously record from the 4 sub-volumes of the above v-FOV. The number of light beads in this example is 40, but as discussed in the preceding examples, the specific number of beamlets that may be generated by the spatiotemporal multiplexing module 100 or the c-MAM 601 is configurable and neither the spatiotemporal multiplexing module 100 nor the c-MAM 601 are limited to generating a specific number beamlets.

Figure 6B:
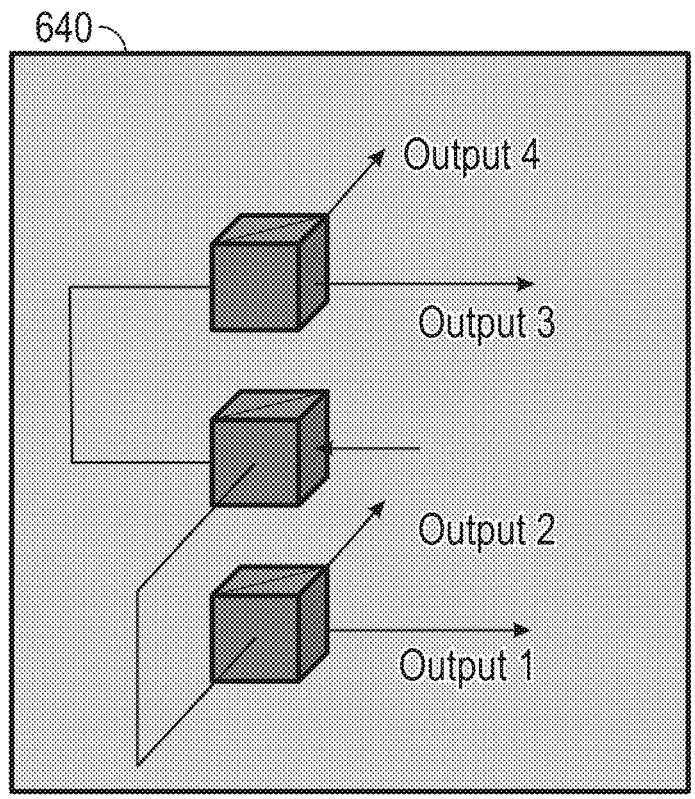
FIG. 6B is a diagram showing an example spatial multiplexing module.
Figure 6C:
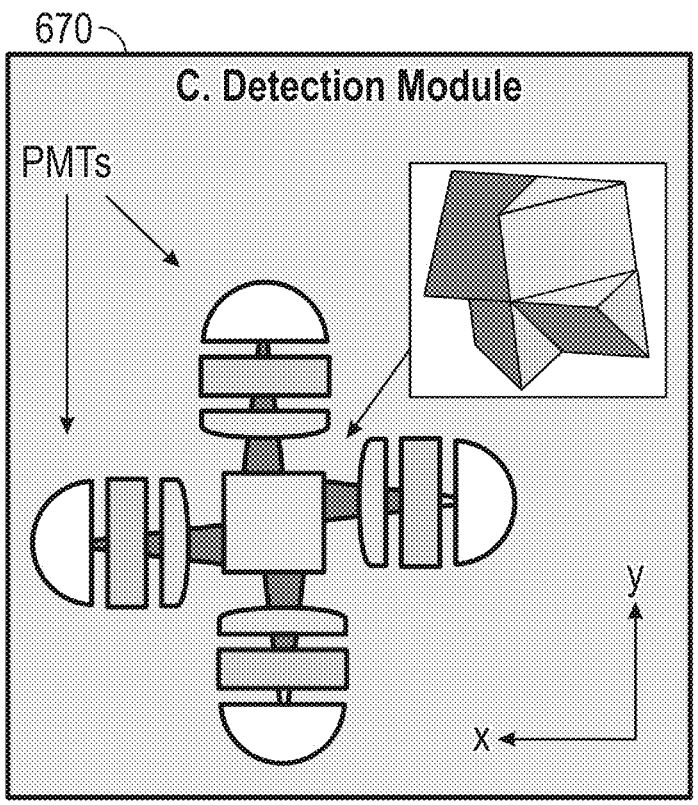
FIG. 6C is a diagram of an example detection module that may be used with the spatial multiplexing module of FIG. 6B.

FIG. 6B shows a spatial multiplexing (s-Mux) module 640 that includes four beam splitters that are arranged to split the incoming pluses into four portions, where each portion is directed to a sub-FOV separated by >1 mm at the sample without incurring differential path length. Spatial multiplexing will be achieved using the unique design of a dedicated beam splitter module, such as spatial multiplexing module 640 shown in FIG. 6B, that will allow for equal splitting of power while minimizing dispersion and introducing no pathlengths difference between the spatially multiplexed sub-beams. Using a laser source delivering ~1-1.5 µJ pulse energies at ~4 MHz repletion rate and 960 nm provides sufficient pulse energy to effectively excite all 40×4=160 locations in the sample at the same time with sufficient SNR. The signals generated by the four c-MAM excited sample locations may be collected by using a specially designed 4-way optical reflector that divides the entire 7.5 mm×7.5 mm FOV into 2×2 laterally stitched sub-FOVs, the fluorescence signal of each of which will be directed to one of the 4 PMTs and subsequently temporally demultiplexed as shown in FIG. 6C. FIG. 6C show an example detection module 670 that includes a "pin-wheel" array of a knife-edge prism mirrors that splits the collected fluorescence into four quadrants, where each quadrant includes a dedicated photomultiplier tube (PMT) detector. While the preceding example shows four-way spatial multiplexing, other implementation mays may provide for other multiples of the beams to be generated and detected. Furthermore, the spatial multiplexing techniques are not limited to detecting fluorescence and may be used to detect light from other imaging techniques which may be implemented using c-MAM.

Figure 7:
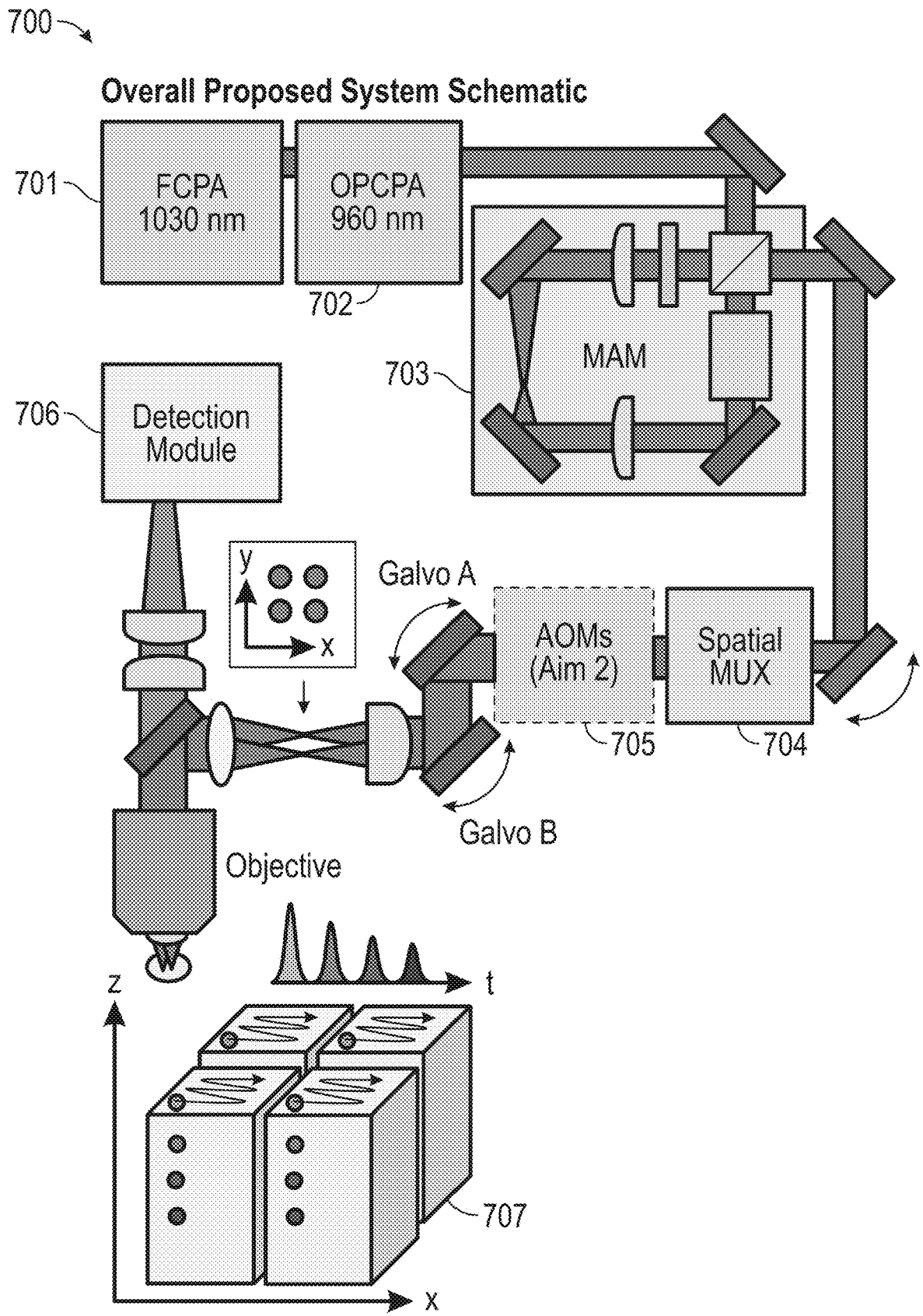
FIG. 7 shows a schematic of an example system that incorporates the c-MAM.

FIG. 7 shows a schematic of an example system 700 that incorporates the c-MAM 601. The system 700 includes a fiber chirped-pulse amplifier (FCPA) 701 which emits the pulsed laser beam, which passes through an optical parametric chirped-pulse amplifier (OPCPA) 702 as in the preceding examples. To obtain optical access to a 7.5 mm FOV at sufficiently high NA and working distance, the system 700 may include a custom objective and tube lens design which provides a nominal clear FOV of ~8 mm. Using this combination, the system 700 may obtain sufficiently high NA and low aberrations over the imaging FOVs that allow for lateral PSF sizes as small as ~0.8-1 µm while maintaining a working distance of ~5 mm.

The output from the OPCA may be provided as an input to the c-MAM 703, which may operate similarly to the c-MAM 601 discussed in the preceding examples. The output from the c-MAM 704 may be provided as an input to the spatial multiplexing module 704, and the output from the spatial multiplexing module 704 provided as an input to the optical modulation module 705.

Figure 9:
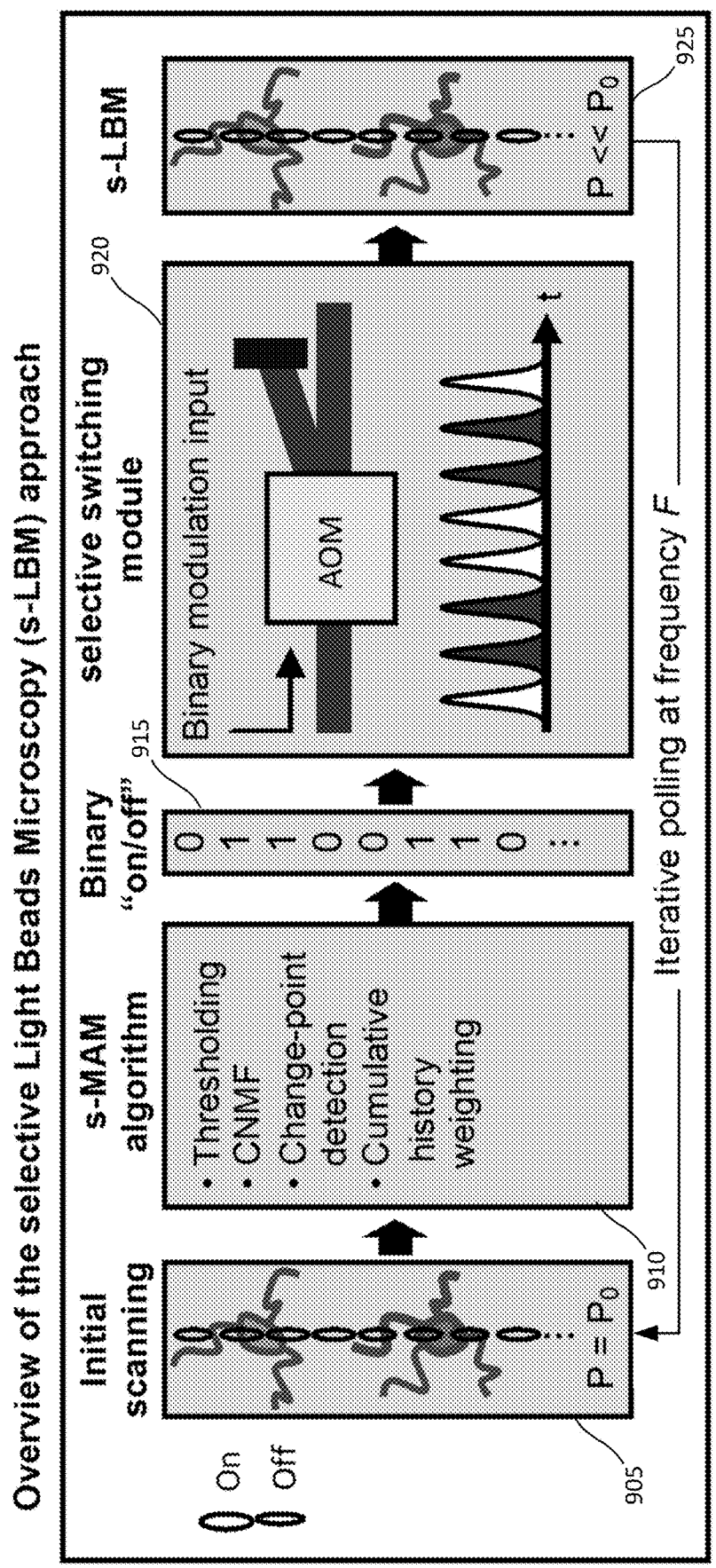
FIG. 9 is a diagram of a selective switching module enabling Selective Light Beads Mesoscopy (s-LBM).

The spatial multiplexing module 704 may be implemented using the spatial multiplexing (s-Mux) module 640 shown in FIG. 6B. The detection module 706 may be configured to implement the detection module 670 shown in the preceding examples. Furthermore, the optical modulation module 705 may be used to implement the s-LBM using Closed-Loop Active Switching techniques discussed in the examples which follow. The optical modulation module 705 may dynamically switch on or off individual light beads as will be discussed in the detail below. FIG. 9, discussed in detail below, provides an example implementation of an optical modulation module that may used to implement the optical modulation module 905. Diagram 707 shows four sub-volumes of a sample that may be scanned using the multiplexed output of the spatial multiplexing module 704 and a scanning scheme that may be used for scanning these four sub-volumes. While the spatial multiplexing module 704 is configured to multiplex the four times, other configurations may be configured to multiplex a different number of times.

Figure 8:
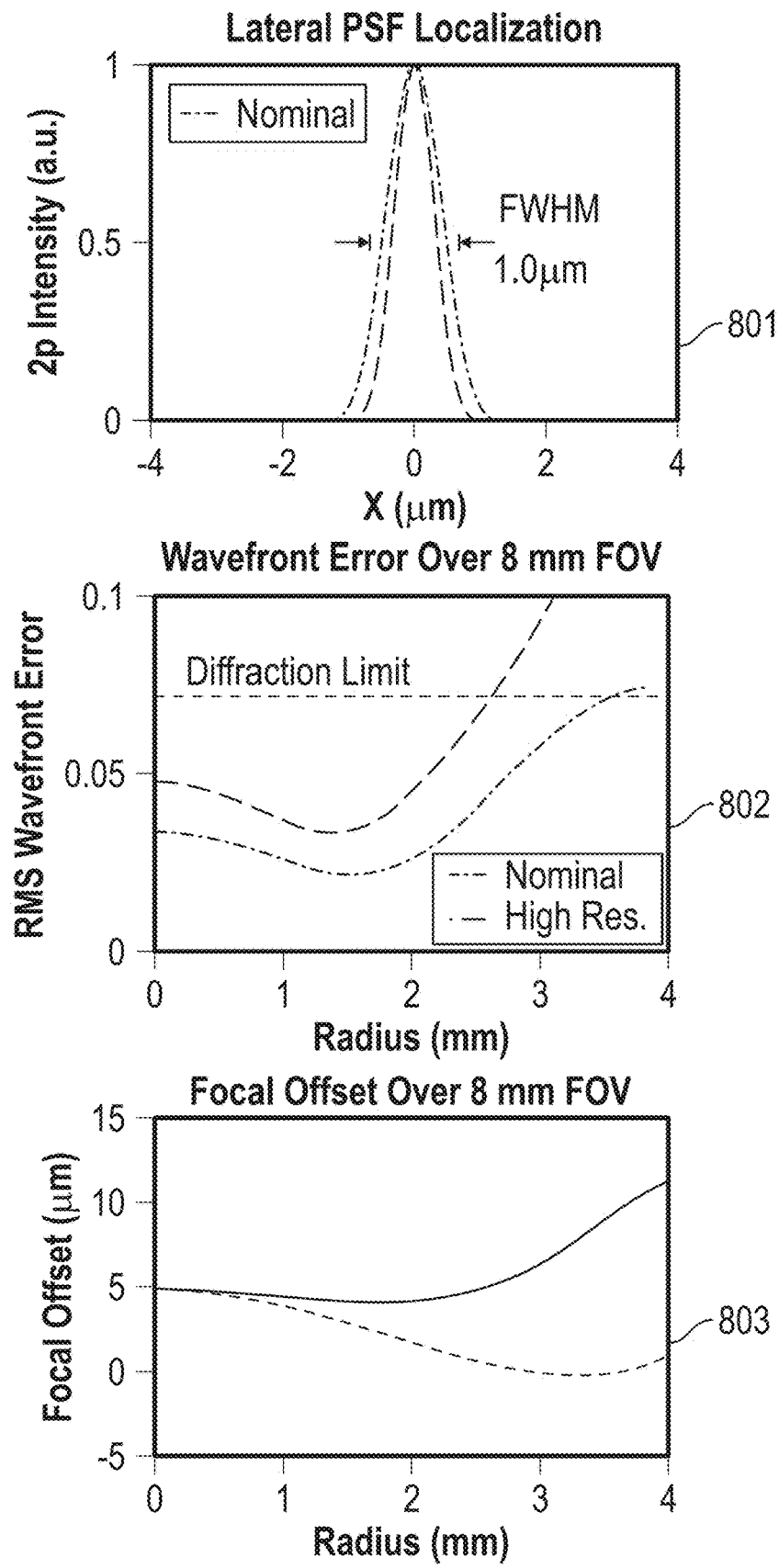
FIG. 8 shows examples of simulated system performance data.

FIG. 8 provides examples of simulated system performance data for the system 700. Chart 801 shows PSF diameters for nominal and high-resolution mode. Chart 802 shows root-mean-square (RMS) wavefront error across the FOV. Chart 803 shows focal offset across the FOV.

Temporal demultiplexing and signal extraction in LBM: The effective voxel acquisition rate of 640 MHz in the 4-fold spatially multiplexed LBS sets high demands on the data acquisition and temporal demultiplexing electronic and software. Since the signals from the 4-fold spatially multiplexed sub-FOV will be collected by 4 separate PMTs, the data acquisition and demultiplexing logic of c-MAM from a single channel will be replicated 4 times. To enable the acquisition and temporal demultiplexing of a single channel of the c-MAM module 601 under the one pulse-per pixel excitation condition, a master clock is generated in the range of ~2 GHz by multiplying a trigger signal from our pulsed laser system which will be fed to a high bandwidth digitizer and field programmable gate array (FPGA). This clock signal is used within a customized version of the ScanImage acquisition software to synchronize the line trigger to the pulse repetition rate of the laser, thus ensuring a single laser pulse constitutes one voxel of the recording. The fast sample clock allows the system to define and temporally demultiplex the 40 channels by integrating the raw PMT signals over a well-defined number of clock samples (~12) with respect to a trigger pulse from the laser.

Design, development and demonstration of a selective LBM (s-LBM): The design of our proposed c-MAM-based LBM discussed in the preceding examples may be extended by implementing s-LBM in which the individual foci, i.e., the light beads can be switched on and off or have their power level adjusted in a closed-loop, adaptive and iterative fashion during recordings. For example, this approach may reduce the exposure of the sample to ~⅕ of the average laser power used in the current LBM realization. This will in principle allow for future realization of acquisition schemes from at least 5-times larger volumes, but also enable high-speed volumetric recording from dimmer and low SNR probes such as the GEVIs while maintaining the same overall power-budget. The reduction in the amount of exposure of the sample to laser power may be adjusted by different amounts in other implementations based on the requirements of the acquisition scheme of those implementations.

s-LBM Using Closed-Loop Active Switching:

The average density of neurons in the rodent brain is ~92,000 per $mm^3$ and the average size of neuronal cell bodies is ~15-20 μm. This means that only ~20% of the imaged volume is filled by neuronal cell bodies. Thus, when performing large-scale single neuron resolution $Ca^{2+}$ imaging, ~80% of the excitation power is delivered to sample locations that do not overlap with neuronal cell bodies. While both the preliminary implementation of the LBM using MAM as well as its proposed spatially multiplexed version through the collinear c-MAM approach can operate at sample power densities that are within the established limits of tissue heating, it is nevertheless desirable to exploit this potential for reducing power exposure by ~5-times for several reasons. First, generally a lower level of brain exposure to laser light will result in recoding conditions that are closer to the native physiological conditions. Second, reducing the total power at the sample while maintaining the same voxel SNR will allow in principle for future realization of volumetric $Ca^{2+}$ imaging over at least 5-times larger volumes. While such further increase of cortical recoding volume might be less relevant for the mouse brain, it will be highly relevant for applications of our method to non-human primates (NHP). Third, since current GEVIs suffer from a lack of brightness, exhibit very fast response times and are exclusively localized in the cell membrane, they are not compatible with existing volumetric $Ca^{2+}$ imaging approaches, at least not over volume sizes that would capture a large population. In this context, the above gain in efficiency can be used to increase voxel SNR by ~25-times while maintaining the current total power levels. Thus, this enhancement in SNR by the method provided herein allows realization of cellular resolution volumetric voltage imaging at ~400 Hz or higher, while ideally compensates for the above limitations of the current GEVIs. Lastly, by reducing the number of voxels in the 3D imaging volume that are receiving simultaneous excitations at any given point in time, scatter-induce crosstalk will be reduced between our 4 spatially multiplexed strings of light beads. Thereby compared to the case when all light beads in LBM are receiving excitations, in principle is possible to accommodate for a shorter lateral distance between the spatially multiplexed beams for the same level of tolerable crosstalk. This would allow for implementation of spatial multiplexing within smaller FOV or a higher degree of spatial multiplexing within the mesoscale imaging FOV.

To realize s-LBM, after spatial multiplexing, each of the 4 strings of light beads generated by the c-MAM module may be sent through a high-bandwidth (~160 MHz) acousto-optical modulator (AOM), which will allow for passing or deflecting each individual light bead in each string within the 6.25 ns inter-pulse time of the laser while the temporally multiplexed string of light beads is propagating through each AOM. Thereby, the individual light beads, directed at different axial locations in each of the sub-volumes, can be switched on and off on the time scale of the fluorescence lifetime as they are being laterally scanned. Alternatively, the power level of the individual light beads may be adjusted rather than simply switching on or off a particular light bead. In s-LBM, no a-priory knowledge about the neuron locations is necessary. This information will be generated and iteratively and repeatedly updated during the recording by s-LBM itself. Initially, all light beads will be in their "on" state. After a few recorded volumes, the raw signals from each voxel in the sample will be thresholded depending on a criterion that would indicate the presence of a neuronal cell body at that sample voxel. For all voxels at which the recorded signal is below the threshold criterion, an analog signal will be generated by our data acquisition system and the corresponding sub-pulse will be deflected by the AOM. The "on" and the "off" states of the light beads may be periodically evaluated and updated using a change-point detection-like algorithm that takes the previous history of the state of each light bead into account (see FIG. 9). Thereby, neurons will be identified that have been inactive during the initialization or any subsequent imaging period while voxels that might have been initially incorrectly classified as containing neuronal cell bodies will be turned off in subsequent cycles of the recording. In this fashion, the utilized power level at the sample converges iteratively to a level given by the actual number of neuronal cell bodies in the recoding volume. It is important to note that the s-LBM approach provided herein does not suffer from sample induced motion artifacts for at for two reasons. First, the size of the PSF for recording neuronal cell bodies is ~2-4-times larger than the diffraction limited PSFs used in random access microscopy. This will result in a higher level of resilience towards sample motion. Second, and more importantly, s-LBM exhibits 3 orders of magnitude higher recorded voxel density and more than 3 orders of magnitude higher voxel acquisition rate compared to random access microscopy. This feature makes within-frame axial motion virtually non-existent for s-LBM while our higher voxel sampling density results in multiple excitations (~5-25) per neuron, allowing for disambiguation of neuroactivity from sample motion.

Preliminary data and biological applications: To demonstrate the feasibility of s-LBM and to compare the obtainable neuronal positions and activity traces with this method to a structural and functional ground truth, a series of experiments and experimentally guided simulations were performed. To obtain spatial and temporal ground truth, high speed $Ca^{2+}$ imaging was performed at 28 Hz using a pixel spacing of 0.5 μm for 2 minutes. Neuronal positions were identified, and their time series was extracted using our previously established standard CaIMAN data processing pipeline. The effect of the implementation of the proposed s-LBM was then evaluated within an imaging plane by assuming a larger voxel spacing and implementing the operation modality of s-LBM in the following fashion: the voxel values for 5 subsequent frames were averaged for each voxel and subsequently, based on the cumulative distribution of the voxel values, a threshold was applied. Thereby an initialization condition for all voxel settings ("on" or "off") were obtained which represented our best estimate as to whether a given voxel contained a neuron or not. This evaluation was repeated after the "polling time" T over the entire imaging time. The results, which were evaluated based on a receiving operator characteristics (ROC) framework. As expected, the sensitivity for identifying a neuron increases with both a lower threshold value and higher polling frequencies. However, even for polling frequencies in the range of 0.5-1 Hz—which are well in-line with the timescales of the closed-loop selective switching hardware and software and for threshold values ~08.-0.9, the obtainable sensitivities can reach >90%. At these conditions, the need for power at the sample can be reduced to ~20% of the full power value. A sensitivity of >90% directly implies low values for false negatives while our method also naturally exhibits a low susceptibility to false positives since in our approach, excitation voxels and thereby information is removed from the recording.

The s-LBM platform provides a versatile solution that allows volume size to be traded off for spatial resolution while increasing the temporal acquisition rate of the volume. By going from the mesoscopic volume to a volume of ~1.0×1.0×0.5 $mm^3$, the s-LBM platform is able to perform synaptic resolution s-LBM capable of recording the activity of axonal and dendritic processes within this volume at ~35 Hz as well as single cell resolution high-speed volumetric recording at ~400 Hz and beyond, opening up new possibilities for volumetric optical voltage imaging using GEVIs.

FIG. 9 is a diagram of a selective switching schematic 900 enabling s-LBM. FIG. 9 illustrates an iterative polling process in which: all beads are turned on for a ~1 s recording with some total power Po, candidate neurons are identified and localized and the state of each light bead is correspondingly assigned a Boolean "on" or "off" value. This Boolean map modulates an acousto-optic modulator (AOM) which turns off light beads that do not overlap with neurons or other objects of interest in a sample. In other implementations, the Boolean map may be replaced with a map of power values, percentages, or other values that indicate a power level of each individual bead that should be set to rather than turning on or turning off each respective bead. The process may be repeated with the polling frequency F leading to a reduction of the $P_o$ to P $P_o$/5.

In operation 905, the initial scanning is performed in which all beads are turned on until the locations of neurons within the candidate neurons are identified. In operation 910, a selective-MAM (s-MAM) algorithm may be applied to determine which of the beads should be turned on and which of the beads should be turned off. The beads associated with locations in the sample that do not appear to have a neuron present may be turned off. The s-MAM may determine threshold criterion whether a neuron is present at a particular location by: (1) determining whether a signal associated with light detected at the respective location within the volume of the sample exceeds a threshold; (2) analyzing signals associated with light detected at the respective location in the sample using a factorization algorithm to determine whether the object of interest is present at the respective location, the factorization algorithm may be a Constrained Nonnegative Matrix Factorization (3) determining whether the object of interest is present at the respective location within the volume based on change-point detection of signals associated with light detected at the respective location within the volume; (4) determining whether the object of interest is present at the respective location within the volume based on cumulative history weighting of signals associated with light detected at the respective location in the volume of the sample; or (5) a combination of two or more of these determinations. In operation 915, an array of binary values representing each of the beads may be generated based on the determination from operation 910. In operation 920, the beads may be selectively turned on or off based on the binary values determined in operation 915. In some implementations, the binary values may be generated as a binary signal that may be provided to the AOM to cause the AOM to selectively deflect the light beads for locations in the sample where no candidate neuron was present. In operation 925, the sub-pulses corresponding to the beads that are turned off will be deflected by the AOM or other means for deflecting the sub-pulses. The "on" and the "off" states of the light beads will be periodically evaluated and updated.

Figure 10:
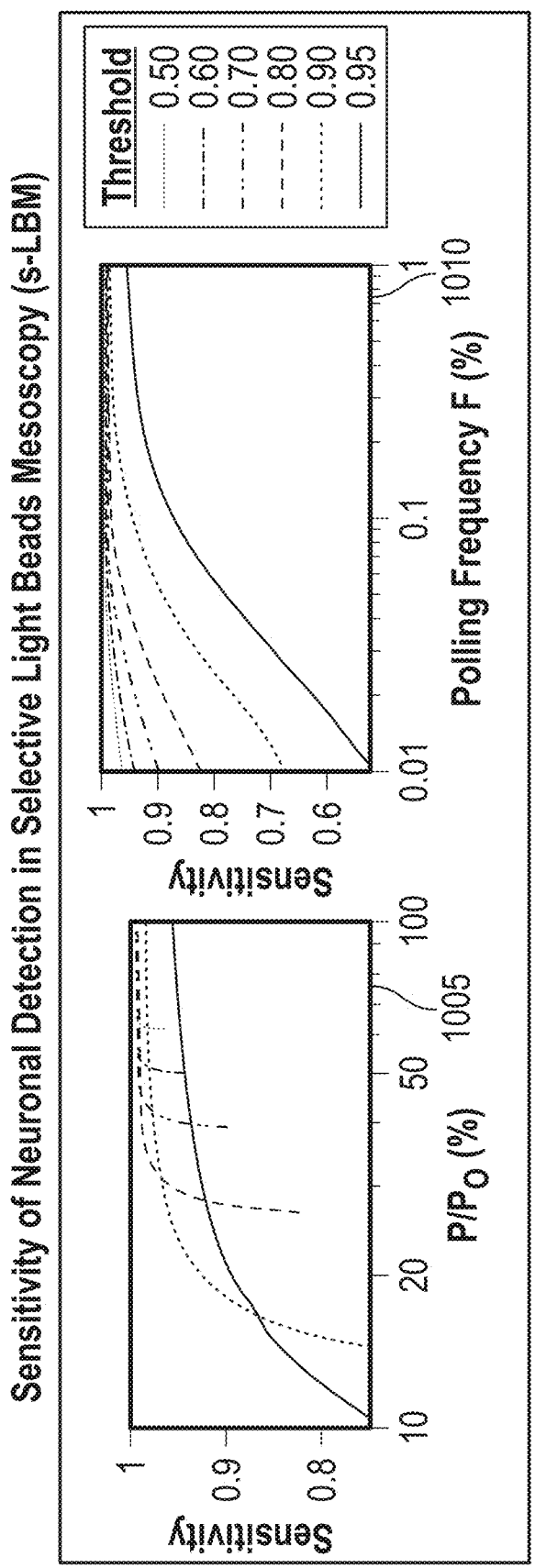
FIG. 10 provides a first chart of simulated sensitivity as a function of the polling frequency F and threshold value and a second chart of simulated sensitivity versus reduction in required imaging power for different threshold values.

FIG. 10 provides a chart 1005 of simulated sensitivity (1−false negative rate) as a function of the polling frequency F and threshold value. Thresholds are determined by setting a minimum pixel value based on the cumulative distribution of values in the frame. FIG. 10 also provides a chart 1010 of simulated sensitivity versus reduction in required imaging power for different threshold values. Power is function of threshold.

Figure 11:
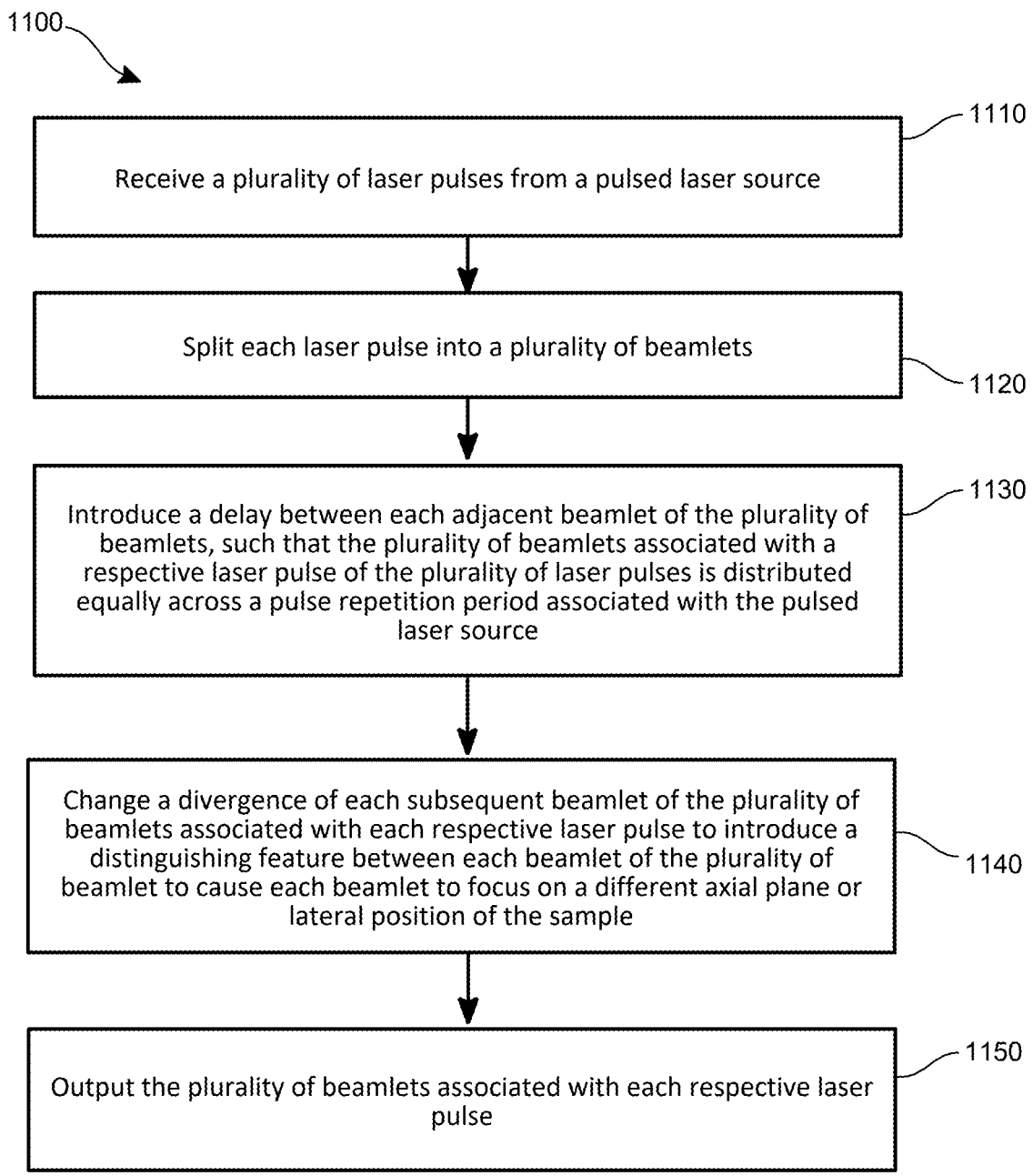
FIG. 11 is a flow diagram of a process for operating a spatiotemporal multiplexing module to image a sample.

FIG. 11 is a flow diagram of a process 1100 for operating a spatiotemporal multiplexing module to image a sample. The process 1100 may be implemented by the spatiotemporal multiplexing module 100 discussed in the preceding examples. The process 1100 may be used to implement, at least in part, the MAXiMuM techniques or the c-MAM techniques shown in the preceding figures.

The process 1100 may include an operation 1110 of receiving a plurality of laser pulses from a pulsed laser source. As shown in FIGS. 1A, 2B, and 6, the pulsed laser source may provide an input beam to the multiplexing module. The process 1100 may include an operation 1120 splitting each laser pulse into a plurality of beamlets using the spatiotemporal multiplexing module 100. The spatiotemporal multiplexing module 100 may include a first re-imaging cavity 110 that includes an output coupler, also referred to as a beamsplitter or PRM, for splitting the laser pulse receive from the pulsed laser source into series of beamlets or pulses. The beamsplitter redirects the majority of the light incident on the beamsplitter back through the re-imaging cavity 110 and outputs the remainder of the light from the re-imaging cavity 110 to the secondary re-imaging cavity 115.

The process 1100 may include an operation 1130 introducing a delay between each adjacent beamlet of the plurality of beamlets using the multiplexing module. The plurality of beamlets associated with a respective laser pulse of the plurality of laser pulses is distributed equally across a pulse repetition period associated with the pulsed laser source. As discussed in the preceding examples, the delay is introduced by the beamsplitter redirecting the majority of the beam back through a re-imaging cavity of the multiplexing module, and each round trip through the cavity introduces a temporal delay.

The process 1100 may include an operation 1140 of changing a divergence of each subsequent beamlet of the plurality of beamlets associated with each respective laser pulse to introduce a distinguishing feature between each beamlet of the plurality of beamlet to cause each beamlet to focus on a different axial plane or lateral position of the sample. Each round trip through the cavity may also provide a lateral or axial offset in the focal plane in addition to the temporal offset introduced between beamlets. This temporal and/or positional offset information may be used to distinguish between light resulting from fluorescence at different positions within the sample.

The process 1100 may include an operation 1150 of outputting the plurality of beamlets associated with each respective laser pulse. The beamlets may be output by the multiplexing module as discussed in the preceding examples. The beamlets output to a microscope and the microscope scans a set of axially separated and temporally distinct foci as shown in FIG. 2. The beamlets may be processed by a spatial multiplexing module and/or an optical modulation module as discussed in the preceding examples.

Figure 12:
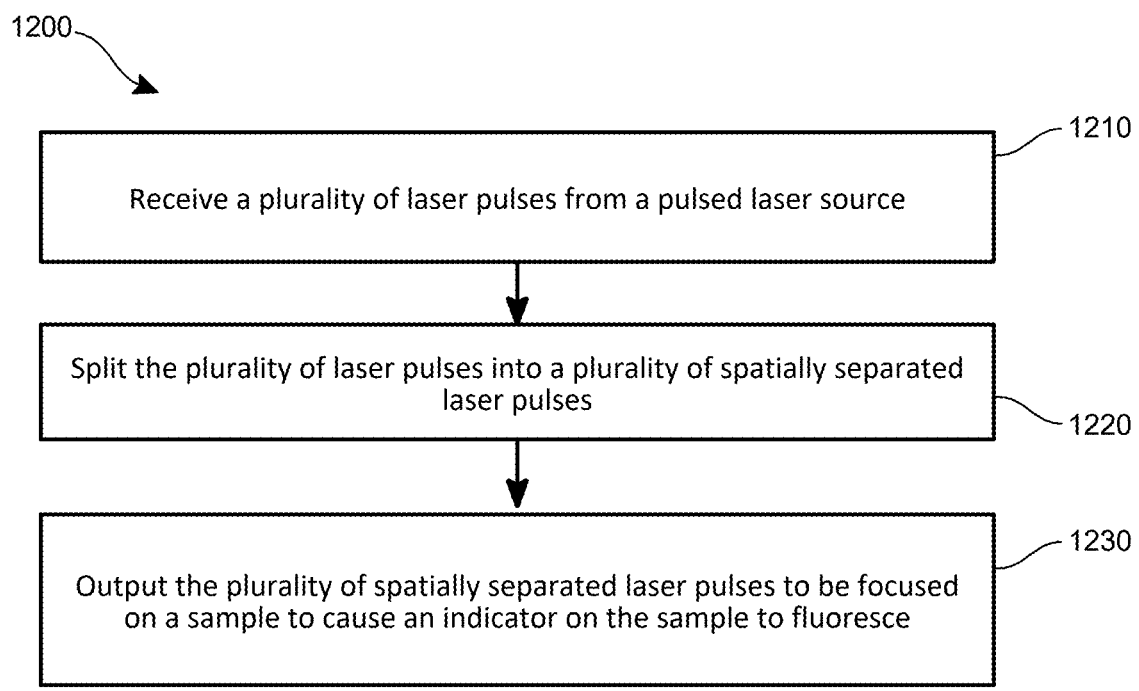
FIG. 12 is a flow diagram of a process for operating a spatial multiplexing module to image a sample.

FIG. 12 is a flow diagram of a process 1200 for operating a spatial multiplexing module to image a sample. The spatial multiplexing module may be implemented by the spatial multiplexing module 640 shown in FIG. 6B. The spatial multiplexing module may be implemented by a dedicated beam splitter that allows for equal splitting of power while minimizing dispersion and introducing no pathlengths difference between the spatially multiplexed sub-beams.

The process 1200 may include an operation 1210 of receiving a plurality of laser pulses from a pulsed laser source. As discussed in the preceding examples, the plurality of laser pulses may be multiplexed into a plurality of beamlets. In some implementations, the plurality of spatially separated laser pulses may be focused on a sample to cause an indicator on the sample to fluoresce. However, the spatial multiplexing module may be used with other types of imaging techniques, such as but not limited to voltage imaging.

The process 1200 may include an operation 1220 of splitting the plurality of laser pulses into a plurality of laterally separated laser pulses. The spatial multiplexing module 640 may be used to split each of the laser pulses and/or the set of beamlets into multiple laterally separated beamlets that may be used to simultaneously scan more than one portion of a sample simultaneously. The process 1200 may include an operation 1230 of outputting the plurality of laterally separated laser pulses to be focused on a sample to cause an indicator on the sample to fluoresce. The spatial multiplexing module 640 may be used to split each of the laser pulses and/or the set of beamlets into multiple laterally separated beamlets that may be output by the spatial multiplexing module 640. The laser pulses and/or the set of beamlets into multiple laterally separated beamlets may be directed to the sample to simultaneously scan more than one portion of a sample simultaneously.

The spatial multiplexing module 640 may be integrated with an imaging device comprising a two photon or multiphoton excitation scanning microscope. The microscope may be configured to focus each of the plurality of sets of laterally separated beamlets onto a separate region of a sample. The imaging device is further integrated with a spatial resolved detector, such as the detection module 670 shown in FIG. 6C. The spatial resolved detector may be configured to split light associated with each respective region of the sample and to direct the light associated each respective region to a separate photodetector associated with that region. In implementations where the beamlets cause an indicator on the sample to fluoresce, the spatial resolved detector may detect light associated with the fluorescence of objects of interest within the sample.

Figure 13:
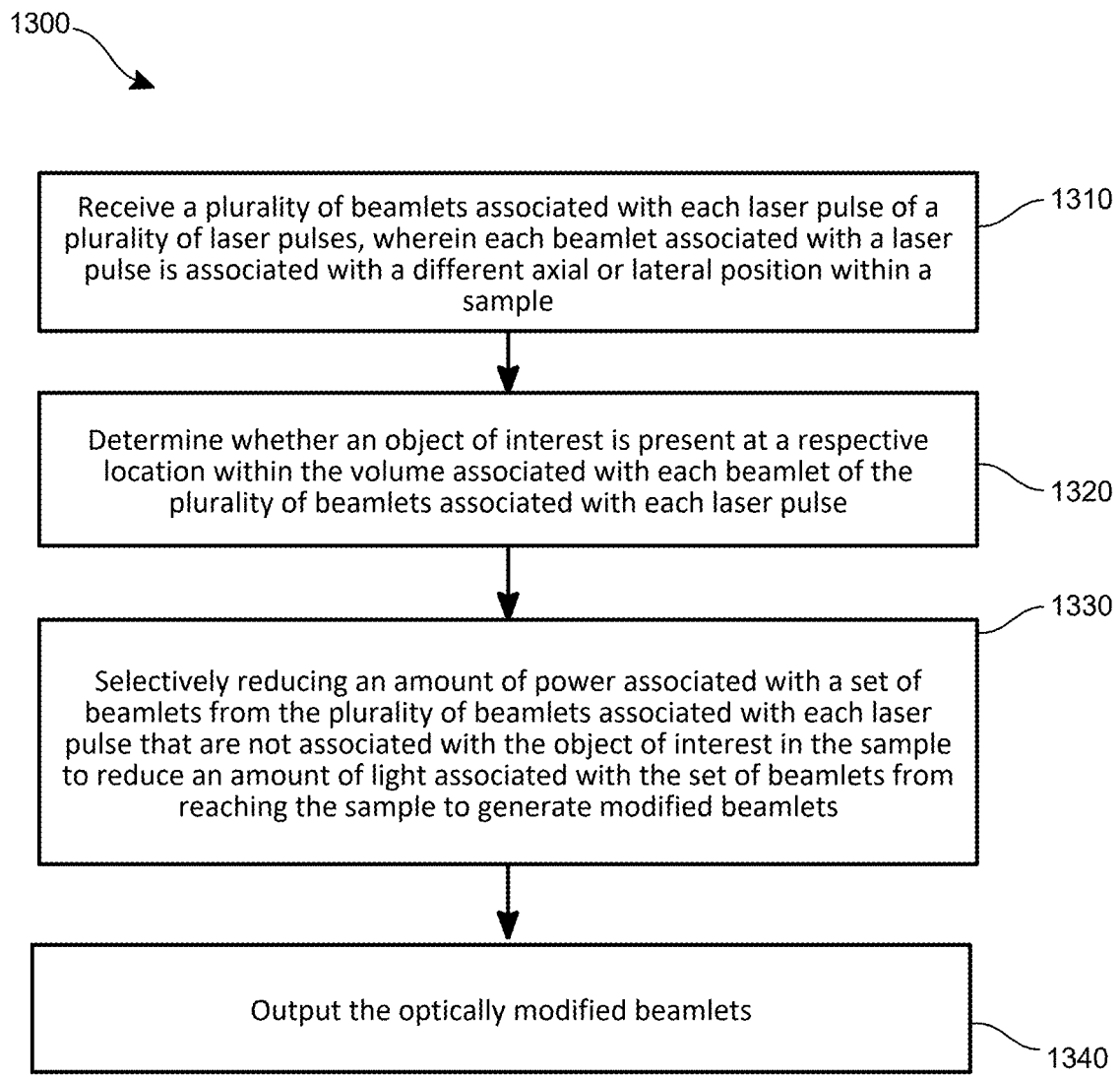
FIG. 13 is a flow diagram of a process for operating an optical modulation module to image a sample.

FIG. 13 is a flow diagram of a process 1300 for operating an optical modulation module to image a sample. The process 1300 may be implemented by the optical modulation module 705 and the selective switching schematic 900 shown in FIG. 9.

The process 1300 may include an operation 1310 of receiving a plurality of beamlets associated with each laser pulse of a plurality of laser pulses. Each beamlet is associated with a laser pulse is associated with a different axial or lateral position within a sample. Each laser pulse may be subdivided into a plurality of beamlets using the MaXiMuM module or the c-MAM discussed in the preceding examples.

The process 1300 may include an operation 1320 of determining whether an object of interest is present at a respective location within the volume associated with each beamlet of the plurality of beamlets associated with each laser pulse. The s-LBM using Closed-Loop Active Switching techniques discussed above may be used to determine whether an object of interest, such as but not limited to a neuron, is present at a particular location within the volume of the sample. The beamlets or light beads associated with locations where no object of interest are detected in the sample volume may be selectively switched off or the power level of the beamlets or lights beams may be selectively adjusted higher or lower. Furthermore, if location was incorrectly determined to not include an object of interest, the beamlet or light bead associated with that location may be selectively switch on.

The process 1300 may include an operation 1330 of selectively adjust the amount of power associated with a set of beamlets from the plurality of beamlets for which no object of interest is located at the respective location in the volume associated with the respective location in the volume of the sample associated with the respective beamlet to reduce an amount of light associated with the set of beamlets from reaching the sample to generate modified beamlets. In the examples discussed in the preceding examples, an acousto-optical modulator (AOM) may be used to deflect the beams to be turned off. In other implementations, other types of optical modulators may be used to selectively turn on or off the beams or light beads to prevent the beamlets or light beads that have been turned off from reaching the sample.

The process 1300 may include an operation 1340 of outputting the optically modulated beamlets. As discussed with respect to FIG. 9, the process 1300 may be performed iteratively to dynamically determine which beamlets or light beads may be turned on or off.

The detailed examples of systems, devices, and techniques described in connection with FIGS. 1A-13 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1A-13 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 14:
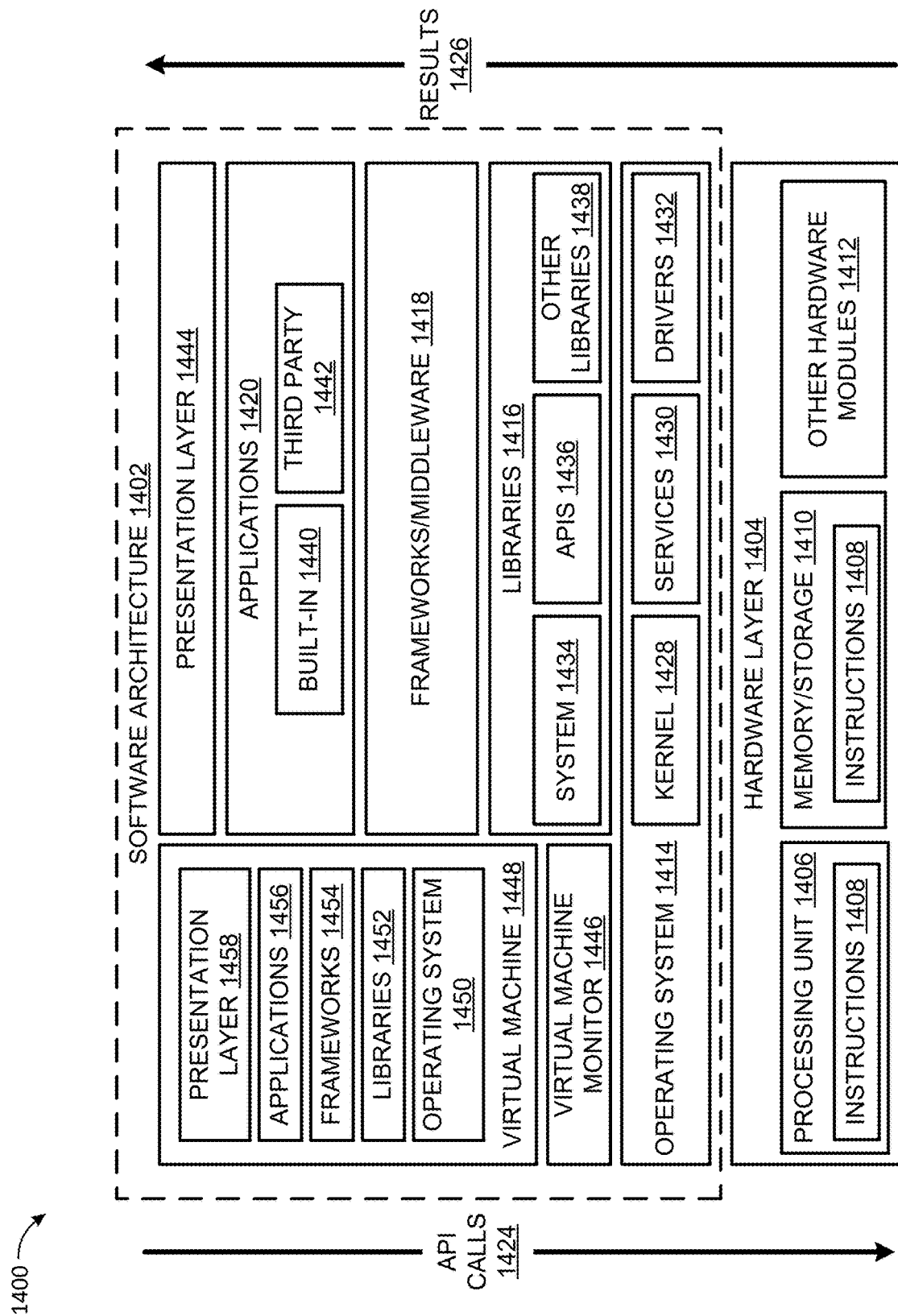
FIG. 14 is a block diagram showing an example software architecture, various portions of which may be used in conjunction with various hardware architectures herein described, which may implement any of the described features.

FIG. 14 is a block diagram 1400 illustrating an example software architecture 1402, various portions of which may be used in conjunction with various hardware architectures herein described, which may implement any of the above-described features. FIG. 14 is a non-limiting example of a software architecture and it will be appreciated that many other architectures may be implemented to facilitate the functionality described herein. The software architecture 1402 may execute on hardware such as a machine 1500 of FIG. 15 that includes, among other things, processors 1510, memory 1530, and input/output (I/O) components 1550. A representative hardware layer 1404 is illustrated and can represent, for example, the machine 1500 of FIG. 15. The representative hardware layer 1404 includes a processing unit 1406 and associated executable instructions 1408. The executable instructions 1408 represent executable instructions of the software architecture 1402, including implementation of the methods, modules and so forth described herein. The hardware layer 1404 also includes a memory/storage 1410, which also includes the executable instructions 1408 and accompanying data. The hardware layer 1404 may also include other hardware modules 1412. Instructions 1408 held by processing unit 1406 may be portions of instructions 1408 held by the memory/storage 1410.

The example software architecture 1402 may be conceptualized as layers, each providing various functionality. For example, the software architecture 1402 may include layers and components such as an operating system (OS) 1414, libraries 1416, frameworks 1418, applications 1420, and a presentation layer 1444. Operationally, the applications 1420 and/or other components within the layers may invoke API calls 1424 to other layers and receive corresponding results 1426. The layers illustrated are representative in nature and other software architectures may include additional or different layers. For example, some mobile or special purpose operating systems may not provide the frameworks/middleware 1418.

The OS 1414 may manage hardware resources and provide common services. The OS 1414 may include, for example, a kernel 1428, services 1430, and drivers 1432. The kernel 1428 may act as an abstraction layer between the hardware layer 1404 and other software layers. For example, the kernel 1428 may be responsible for memory management, processor management (for example, scheduling), component management, networking, security settings, and so on. The services 1430 may provide other common services for the other software layers. The drivers 1432 may be responsible for controlling or interfacing with the underlying hardware layer 1404. For instance, the drivers 1432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1416 may provide a common infrastructure that may be used by the applications 1420 and/or other components and/or layers. The libraries 1416 typically provide functionality for use by other software modules to perform tasks, rather than rather than interacting directly with the OS 1414. The libraries 1416 may include system libraries 1434 (for example, C standard library) that may provide functions such as memory allocation, string manipulation, file operations. In addition, the libraries 1416 may include API libraries 1436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1416 may also include a wide variety of other libraries 1438 to provide many functions for applications 1420 and other software modules.

The frameworks 1418 (also sometimes referred to as middleware) provide a higher-level common infrastructure that may be used by the applications 1420 and/or other software modules. For example, the frameworks 1418 may provide various graphic user interface (GUI) functions, high-level resource management, or high-level location services. The frameworks 1418 may provide a broad spectrum of other APIs for applications 1420 and/or other software modules.

The applications 1420 include built-in applications 1440 and/or third-party applications 1442. Examples of built-in applications 1440 may include, but are not limited to, a contacts application, a browser application, a location application, a media application, a messaging application, and/or a game application. Third-party applications 1442 may include any applications developed by an entity other than the vendor of the particular platform. The applications 1420 may use functions available via OS 1414, libraries 1416, frameworks 1418, and presentation layer 1444 to create user interfaces to interact with users.

Some software architectures use virtual machines, as illustrated by a virtual machine 1448. The virtual machine 1448 provides an execution environment where applications/modules can execute as if they were executing on a hardware machine (such as the machine 1500 of FIG. 15, for example). The virtual machine 1448 may be hosted by a host OS (for example, OS 1414) or hypervisor, and may have a virtual machine monitor 1446 which manages operation of the virtual machine 1448 and interoperation with the host operating system. A software architecture, which may be different from software architecture 1402 outside of the virtual machine, executes within the virtual machine 1448 such as an OS 1450, libraries 1452, frameworks 1454, applications 1456, and/or a presentation layer 1458.

Figure 15:
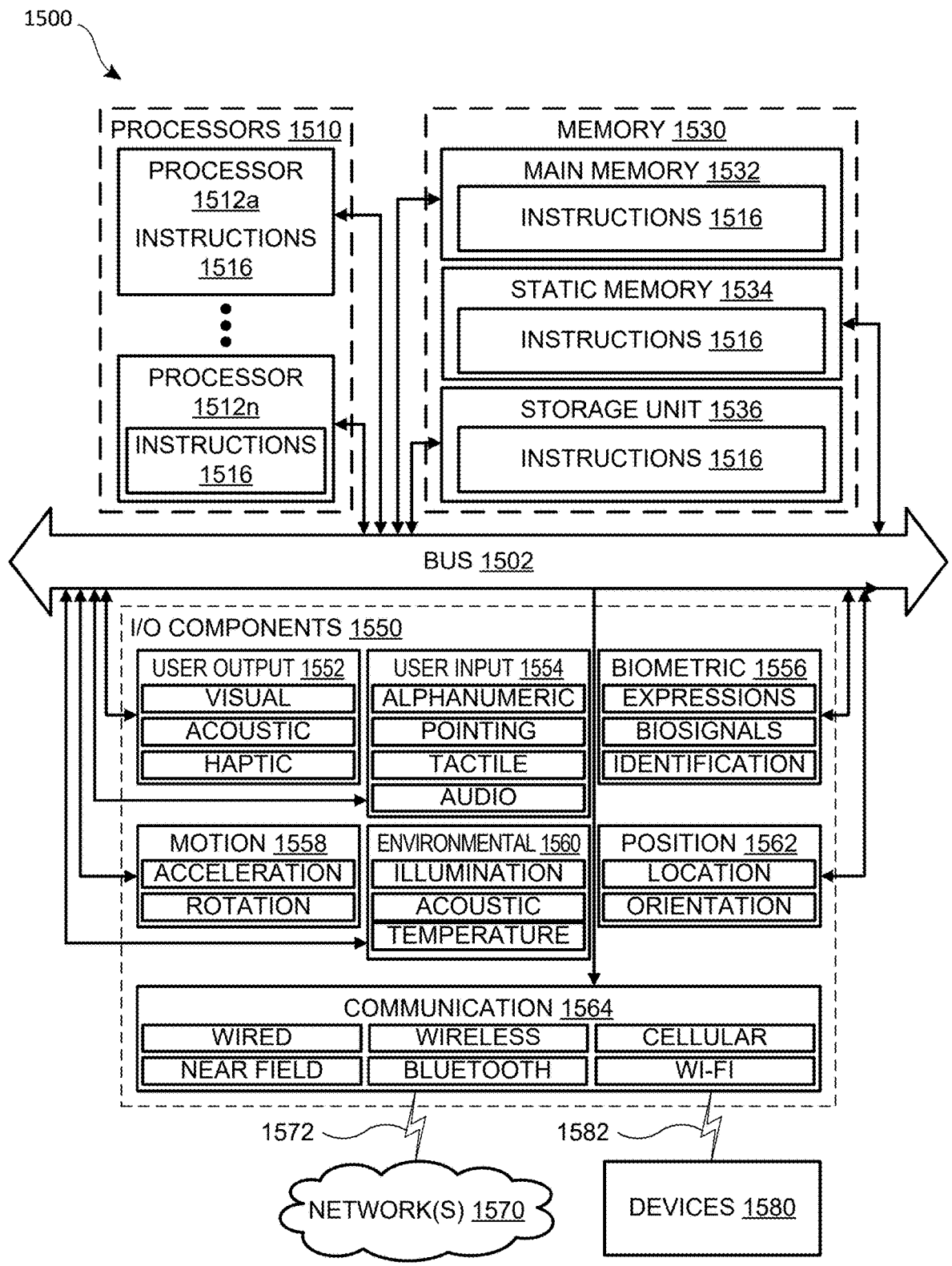
FIG. 15 is a block diagram showing components of an example machine configured to read instructions from a machine-readable medium and perform any of the features described herein.

FIG. 15 is a block diagram illustrating components of an example machine 1500 configured to read instructions from a machine-readable medium (for example, a machine-readable storage medium) and perform any of the features described herein. The example machine 1500 is in a form of a computer system, within which instructions 1516 (for example, in the form of software components) for causing the machine 1500 to perform any of the features described herein may be executed. As such, the instructions 1516 may be used to implement modules or components described herein. The instructions 1516 cause unprogrammed and/or unconfigured machine 1500 to operate as a particular machine configured to carry out the described features. The machine 1500 may be configured to operate as a standalone device or may be coupled (for example, networked) to other machines. In a networked deployment, the machine 1500 may operate in the capacity of a server machine or a client machine in a server-client network environment, or as a node in a peer-to-peer or distributed network environment. Machine 1500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1500 is illustrated, the term "machine" includes a collection of machines that individually or jointly execute the instructions 1516.

The machine 1500 may include processors 1510, memory 1530, and I/O components 1550, which may be communicatively coupled via, for example, a bus 1502. The bus 1502 may include multiple buses coupling various elements of machine 1500 via various bus technologies and protocols. In an example, the processors 1510 (including, for example, a central processing unit (CPU), a graphics processing unit (GPU), a digital signal processor (DSP), an ASIC, or a suitable combination thereof) may include one or more processors 1512a to 1512n that may execute the instructions 1516 and process data. In some examples, one or more processors 1510 may execute instructions provided or identified by one or more other processors 1510. The term "processor" includes a multi-core processor including cores that may execute instructions contemporaneously. Although FIG. 15 shows multiple processors, the machine 1500 may include a single processor with a single core, a single processor with multiple cores (for example, a multi-core processor), multiple processors each with a single core, multiple processors each with multiple cores, or any combination thereof. In some examples, the machine 1500 may include multiple processors distributed among multiple machines.

The memory/storage 1530 may include a main memory 1532, a static memory 1534, or other memory, and a storage unit 1536, both accessible to the processors 1510 such as via the bus 1502. The storage unit 1536 and memory 1532, 1534 store instructions 1516 embodying any one or more of the functions described herein. The memory/storage 1530 may also store temporary, intermediate, and/or long-term data for processors 1510. The instructions 1516 may also reside, completely or partially, within the memory 1532, 1534, within the storage unit 1536, within at least one of the processors 1510 (for example, within a command buffer or cache memory), within memory at least one of I/O components 1550, or any suitable combination thereof, during execution thereof. Accordingly, the memory 1532, 1534, the storage unit 1536, memory in processors 1510, and memory in I/O components 1550 are examples of machine-readable media.

As used herein, "machine-readable medium" refers to a device able to temporarily or permanently store instructions and data that cause machine 1500 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1516) for execution by a machine 1500 such that the instructions, when executed by one or more processors 1510 of the machine 1500, cause the machine 1500 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1550 may include a wide variety of hardware components adapted to receive input, provide output, produce output, transmit information, exchange information, capture measurements, and so on. The specific I/O components 1550 included in a particular machine will depend on the type and/or function of the machine. For example, mobile devices such as mobile phones may include a touch input device, whereas a headless server or IoT device may not include such a touch input device. The particular examples of I/O components illustrated in FIG. 15 are in no way limiting, and other types of components may be included in machine 1500. The grouping of I/O components 1550 are merely for simplifying this discussion, and the grouping is in no way limiting. In various examples, the I/O components 1550 may include user output components 1552 and user input components 1554. User output components 1552 may include, for example, display components for displaying information (for example, a liquid crystal display (LCD) or a projector), acoustic components (for example, speakers), haptic components (for example, a vibratory motor or force-feedback device), and/or other signal generators. User input components 1554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1550 may include biometric components 1556, motion components 1558, environmental components 1560, and/or position components 1562, among a wide array of other physical sensor components. The biometric components 1556 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1558 may include, for example, acceleration sensors (for example, an accelerometer) and rotation sensors (for example, a gyroscope). The environmental components 1560 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1562 may include, for example, location sensors (for example, a Global Position System (GPS) receiver), altitude sensors (for example, an air pressure sensor from which altitude may be derived), and/or orientation sensors (for example, magnetometers).

The I/O components 1550 may include communication components 1564, implementing a wide variety of technologies operable to couple the machine 1500 to network(s) 1570 and/or device(s) 1580 via respective communicative couplings 1572 and 1582. The communication components 1564 may include one or more network interface components or other suitable devices to interface with the network(s) 1570. The communication components 1564 may include, for example, components adapted to provide wired communication, wireless communication, cellular communication, Near Field Communication (NFC), Bluetooth communication, Wi-Fi, and/or communication via other modalities. The device(s) 1580 may include other machines or various peripheral devices (for example, coupled via USB).

In some examples, the communication components 1564 may detect identifiers or include components adapted to detect identifiers. For example, the communication components 1564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1562, such as, but not limited to, geo-location via Internet Protocol (IP) address, location via Wi-Fi, cellular, NFC, Bluetooth, or other wireless station identification and/or signal triangulation.

In the following, further features, characteristics and advantages of the system and method will be described by means of items:

Item 1. A multiplexing module configured to perform operations of: receiving a plurality of laser pulses from a pulsed laser source; splitting each laser pulse into a plurality of beamlets; introducing a delay between each adjacent beamlet of the plurality of beamlets, such that the plurality of beamlets associated with a respective laser pulse of the plurality of laser pulses is distributed equally across a pulse repetition period associated with the pulsed laser source; changing a divergence of each subsequent beamlet of the plurality of beamlets associated with each respective laser pulse to introduce a distinguishing feature between each beamlet of the plurality of beamlet to cause each beamlet to focus on a different axial plane or lateral position of the sample; and outputting the plurality of beamlets associated with each respective laser pulse.

Item 2. The multiplexing module of item 1, wherein the multiplexing module comprises a re-imaging cavity, and wherein to split each laser pulse into a plurality of beamlets the multiplexing module is configured to perform the operations of: passing each laser pulse through a beam splitter to split the laser pulse into a beamlet of the plurality of beamlets to be output by the multiplexing module and a second portion of the laser pulse to reenter the re-imaging cavity.

Item 3. The multiplexing module of item 1, wherein the multiplexing module is further configured to: adjusting a pulse energy by a selected amount for each subsequent beamlet of the plurality of beamlets by selecting a beamsplitter and its alignment having a splitting ratio configured to cause the pulse energy to be adjusted by the selected amount.

Item 4. The multiplexing module of item 1, wherein to introduce the delay between each adjacent beamlet of the plurality of beamlets the multiplexing module is configured to perform the operations of: directing the second portion of the laser pulse around a series of mirrors of the re-imaging cavity to introduce the delay between adjacent beamlets.

Item 5. The multiplexing module of item 4, wherein the multiplexing module is further configured to perform the operation of: introducing an axial offset between each adjacent beamlet to create an offset in the focal plane for each adjacent beamlet.

Item 6. The multiplexing module of item 4, wherein the series of mirrors comprises curved mirrors, and wherein the delay is configurable by changing a distance between the mirrors and focal lengths of the mirrors.

Item 7. The multiplexing module of item 4, wherein the series of mirrors comprise flat mirrors and lenses, and wherein the delay is configurable by changing a distance between the mirrors and focal lengths of the lenses.

Item 8. The multiplexing module of item 4, wherein changing the divergence of each subsequent beamlet causes each beamlet to focus on the different axial plane of the sample, wherein the multiplexing module comprises a second re-imaging cavity, and wherein the second re-imaging cavity is configured to perform operations of: splitting the plurality of beamlets output by the first cavity into a second plurality of beamlets for each respective laser pulse; introducing a delay and a lateral offset between each adjacent beamlet of the plurality of beamlets; increasing the divergence of each subsequent beamlet of the plurality of second beamlets associated with each respective laser pulse; and outputting the plurality of second beamlets.

Item 9. The multiplexing module of item 4, wherein changing the divergence of each subsequent beamlet causes each beamlet to focus on the different lateral position of the sample, wherein the multiplexing module comprises a second cavity, and wherein the second cavity is configured to perform operations of: splitting the plurality of beamlets output by the first cavity into a second plurality of beamlets for each respective laser pulse; introducing a delay between each adjacent beamlet of the plurality of beamlets; increasing the divergence of each subsequent beamlet of the plurality of second beamlets associated with each respective laser pulse; and outputting the plurality of second beamlets.

Item 10. The multiplexing module of item 1, wherein the multiplexing module comprises a re-imaging cavity, and wherein to split each laser pulse into a plurality of beamlets the multiplexing module is configured to perform operations of: rotating a plane of polarization of each laser pulse by passing the through an electro optical modulator (EOM); directing the laser pulse around the multiplexing module to a half-wave plate (HWP); passing each laser pulse through a half-wave plate (HWP) to change the plane of polarization of the laser pulse by a fixed amount such that a chosen portion of the laser pulse can pass through a polarized beam splitter (PSB); and directing the laser pulse to the PSB to cause a first portion of the laser pulse to pass through the PSB and exit the multiplexing module as a beamlet of the plurality of beamlets and a second portion of the laser pulse which is directed back into the re-imaging cavity.

Item 11. The multiplexing module of item 10, wherein the multiplexing module is further configured to: adjusting a pulse energy by a selected amount for each subsequent beamlet of the plurality of beamlets by selecting the HWP having a rotation angle configured to cause the pulse energy to be adjusted by the selected amount for each subsequent beamlet of the plurality of beamlets.

Item 12. The multiplexing module of item 10, wherein to introduce the delay between each adjacent beamlets of the plurality of beamlets the multiplexing module is configured to perform operations of: directing the second portion of the laser pulse around a series of mirrors of the re-imaging cavity to introduce the delay between adjacent beamlets.

Item 13. The multiplexing module of item 12, wherein the series of mirrors comprises curved mirrors, and wherein the delay is configurable by changing a distance between the mirrors and focal lengths of the mirrors.

Item 14. The multiplexing module of item 12, wherein the series of mirrors comprise flat mirrors and lenses, and wherein the delay is configurable by changing a distance between the mirrors and focal lengths of the lenses.

Item 15. The multiplexing module of item 1, wherein the multiplexing module is integrated with an imaging device comprising a two photon or multi-photon excitation scanning microscope, and wherein the two photon or multi-photon excitation scanning microscope is configured to perform operations of: receiving the plurality of beamlets of the plurality of beamlets associated with each respective laser pulse from the multiplexing module; and converting divergences associated with the plurality of beamlets into axial or lateral foci on the sample.

Item 16. The multiplexing module of item 1, wherein to split each laser pulse into a plurality of beamlets, the multiplexing module is configured to perform operations of: splitting each laser pulse into a plurality of beamlets; focusing the plurality of beamlets onto a first knife edge (KE) mirror that is vertically oriented which directs the plurality of beamlets into a re-imaging cavity of the multiplexing module to cause the beamlets to make a round trip of the multiplexing module.

17. The multiplexing module of item 16, wherein the multiplexing module is configured to perform operations of: splitting off a respective beamlet of the plurality of beamlets using a second KE mirror that is vertically oriented for each roundtrip around the multiplexing module; and outputting the respective beamlet after corresponding number of roundtrips associated with its intended delay from the multiplexing module.

Item 18. A method of operating a multiplexing module, the method comprising: receiving a plurality of laser pulses from a pulsed laser source; splitting each laser pulse into a plurality of beamlets; introducing a delay between each adjacent beamlet of the plurality of beamlets, such that the plurality of beamlets associated with a respective laser pulse of the plurality of laser pulses is distributed equally across a pulse repetition period associated with the pulsed laser source; changing a divergence of each subsequent beamlet of the plurality of beamlets associated with each respective laser pulse to introduce a distinguishing feature between each beamlet of the plurality of beamlet to cause each beamlet to focus on a different axial plane or lateral position of the sample; and outputting the plurality of beamlets associated with each respective laser pulse.

Item 19. The method of item 18, wherein the multiplexing module comprises a re-imaging cavity, and wherein splitting each laser pulse into a plurality of beamlets further comprises: passing each laser pulse through a beam splitter to split the laser pulse into a beamlet of the plurality of beamlets to be output by the multiplexing module and a second portion of the laser pulse to reenter the re-imaging cavity.

Item 20. The method of item 18, further comprising: adjusting a pulse energy by a selected amount for each subsequent beamlet of the plurality of beamlets by selecting a beamsplitter and its alignment having a splitting ratio configured to cause the pulse energy to be adjusted by the selected amount.

Item 21. The method of item 18, wherein introducing the delay between each adjacent beamlet of the plurality of beamlets the multiplexing module further comprises: directing the second portion of the laser pulse around a series of mirrors of the re-imaging cavity to introduce the delay between adjacent beamlets.

Item 22. The method of item 21, further comprising: introducing an axial offset between each adjacent beamlet to create an offset in the focal plane for each adjacent beamlet.

Item 23. The method of item 21, wherein the series of mirrors comprises curved mirrors, and wherein the delay is configurable by changing a distance between the mirrors and focal lengths of the mirrors.

Item 24. The method of item 21, wherein the series of mirrors comprise flat mirrors and lenses, and wherein the delay is configurable by changing a distance between the mirrors and focal lengths of the lenses.

Item 25. The method of item 21, wherein changing the divergence of each subsequent beamlet causes each beamlet to focus on the different axial plane of the sample, wherein the multiplexing module comprises a second re-imaging cavity, and the method further comprising: splitting the plurality of beamlets output by the first cavity into a second plurality of beamlets for each respective laser pulse; introducing a delay and a lateral offset between each adjacent beamlet of the plurality of beamlets; increasing the divergence of each subsequent beamlet of the plurality of second beamlets associated with each respective laser pulse; and outputting the plurality of second beamlets.

Item 26. The method of item 21, wherein changing the divergence of each subsequent beamlet causes each beamlet to focus on the different lateral position of the sample, wherein the multiplexing module comprises a second cavity, and the method further comprising: splitting the plurality of beamlets output by the first cavity into a second plurality of beamlets for each respective laser pulse; introducing a delay between each adjacent beamlet of the plurality of beamlets; increasing the divergence of each subsequent beamlet of the plurality of second beamlets associated with each respective laser pulse; and outputting the plurality of second beamlets.

Item 27. The method of item 18, wherein the multiplexing module comprises a re-imaging cavity, and wherein splitting each laser pulse into a plurality of beamlets further comprises: rotating a plane of polarization of each laser pulse by passing the through an electro optical modulator (EOM); directing the laser pulse around the multiplexing module to a half-wave plate (HWP); passing each laser pulse through a half-wave plate (HWP) to change the plane of polarization of the laser pulse by a fixed amount such that a chosen portion of the laser pulse can pass through a polarized beam splitter (PSB); and directing the laser pulse to the PSB to cause a first portion of the laser pulse to pass through the PSB and exit the multiplexing module as a beamlet of the plurality of beamlets and a second portion of the laser pulse which is directed back into the re-imaging cavity.

Item 28. The method of item 27, further comprising: adjusting a pulse energy by a selected amount for each subsequent beamlet of the plurality of beamlets by selecting the HWP having a rotation angle configured to cause the pulse energy to be adjusted by the selected amount for each subsequent beamlet of the plurality of beamlets.

Item 29. The method of item 27, wherein introducing the delay between each adjacent beamlets of the plurality of beamlets further comprises: directing the second portion of the laser pulse around a series of mirrors of the re-imaging cavity to introduce the delay between adjacent beamlets.

Item 30. The method of item 29, wherein the series of mirrors comprises curved mirrors, and wherein the delay is configurable by changing a distance between the mirrors and focal lengths of the mirrors.

Item 31. The method of item 29, wherein the series of mirrors comprise flat mirrors and lenses, and wherein the delay is configurable by changing a distance between the mirrors and focal lengths of the lenses.

Item 32. The method of item 18, wherein the multiplexing module is integrated with an imaging device comprising a two photon or multi-photon excitation scanning microscope, the method further comprising: receiving, at the two photon or multi-photon excitation scanning microscope, the plurality of beamlets of the plurality of beamlets associated with each respective laser pulse from the multiplexing module; and converting axial divergences associated with the plurality of beamlets into axial foci on the sample using the two photon or multi-photon excitation scanning microscope.

Item 33. The method of item 18, wherein splitting each laser pulse into a plurality of beamlets further comprises: splitting each laser pulse into a plurality of beamlets; and focusing the plurality of beamlets onto a first knife edge (KE) mirror that is vertically oriented which directs the plurality of beamlets into a re-imaging cavity of the multiplexing module to cause the beamlets to make a round trip of the multiplexing module.

Item 34. The method of item 33, further comprising: splitting off a respective beamlet of the plurality of beamlets using a second KE mirror that is vertically oriented for each roundtrip around the multiplexing module; and outputting the respective beamlet after corresponding number of roundtrips associated with its intended delay from the multiplexing module.

Item 35. A spatial multiplexing module configured to perform the operations of: receiving a plurality of laser pulses from a pulsed laser source; splitting the plurality of laser pulses into a plurality of spatially separated laser pulses; and outputting the plurality of spatially separated laser pulses, wherein the spatial multiplexing module provides for equal splitting of power while minimizing dispersion and introduces no pathlength difference between the plurality of laser pulses.

Item 36. The spatial multiplexing module of item 35, wherein the plurality of spatially separated laser pulses is to be focused on a sample to cause an indicator on the sample to fluoresce.

Item 37. The spatial multiplexing module of item 35, wherein receiving the plurality of laser pulses from the pulsed laser source further comprises receiving a plurality of beamlets associated with each laser pulse of the plurality of laser pulses, and wherein splitting the plurality of laser pulses into the plurality of spatially separated laser pulses further comprises splitting the plurality of beamlets into a plurality of sets of spatially separated beamlets, wherein the plurality of sets of spatially separated beamlets include a same number of beamlets as the plurality of beamlets.

Item 38. The spatial multiplexing module of item 37, wherein outputting the plurality of spatially separated laser pulses further comprises outputting the plurality of laterally separated sets of beamlets.

Item 39. The spatial multiplexing module of item 37, wherein the spatial multiplexing module is integrated with an imaging device comprising a two photon or multi-photon excitation scanning microscope, and wherein the two photon or multi-photon excitation scanning microscope is configured to perform operations of: focusing each of the plurality of sets of laterally separated beamlets onto a separate region of a sample.

Item 40. The spatial multiplexing module of item 39, wherein the imaging device is further integrated with a spatial resolved detector configured to perform operations of: splitting light associated with each respective region; and directing the light associated each respective region to a separate photodetector associated with that region.

Item 41. A method of operating a spatial multiplexing module, the method comprising: receiving a plurality of laser pulses from a pulsed laser source; splitting the plurality of laser pulses into a plurality of spatially separated laser pulses; and outputting the plurality of spatially separated laser pulses, wherein the spatial multiplexing module provides for equal splitting of power while minimizing dispersion and introduces no pathlength difference between the plurality of laser pulses.

Item 42. The method of item 41, wherein the plurality of spatially separated laser pulses is to be focused on a sample to cause an indicator on the sample to fluoresce.

Item 43. The method of item 41, wherein receiving the plurality of laser pulses from the pulsed laser source further comprises receiving a plurality of beamlets associated with each laser pulse of the plurality of laser pulses, and wherein splitting the plurality of laser pulses into the plurality of spatially separated laser pulses further comprises splitting the plurality of beamlets into a plurality of sets of spatially separated beamlets, wherein the plurality of sets of spatially separated beamlets include a same number of beamlets as the plurality of beamlets.

Item 44. The method of item 43, wherein outputting the plurality of spatially separated laser pulses further comprises outputting the plurality of laterally separated sets of beamlets.

Item 45. The method of item 44, wherein the spatial multiplexing module is integrated with an imaging device comprising a two photon or multi-photon excitation scanning microscope, and wherein the two photon or multi-photon excitation scanning microscope is configured to perform operations of: focusing each of the plurality of sets of laterally separated beamlets onto a separate region of a sample.

Item 46. The method of item 44, wherein the imaging device is further integrated with a spatial detector configured to perform operations of: splitting light associated with each respective region; and directing the light associated each respective region to a separate photodetector associated with that region.

Item 47. An optical modulation module configured to perform the operations of: receiving a plurality of beamlets associated with each laser pulse of a plurality of laser pulses, wherein each beamlet associated with a laser pulse is associated with a different axial or lateral position within a volume of a sample; determining whether an object of interest is present at a respective location within the volume of the sample associated with each beamlet of the plurality of beamlets associated with each laser pulse; selectively adjust the amount of power associated with a set of beamlets from the plurality of beamlets for which no object of interest is located at the respective location in the volume associated with the respective location in the volume of the sample associated with the respective beamlet to reduce an amount of light associated with the set of beamlets from reaching the sample to generate modified beamlets; and outputting the modified beamlets.

Item 48. The optical modulation module of item 47, wherein to reduce an amount of power associated with a set of beamlets the optical modulation module is configured to perform an operation of: deflecting the set of beamlets from the plurality of beamlets to prevent the set of beamlets from reaching the sample.

Item 49. The optical modulation module of item 47, wherein to determine whether an object of interest is present at a respective location within the volume of the sample associated with each beamlet of the plurality of beamlets associated with each laser pulse the optical modulation module is configured to perform an operation of: determining whether a signal associated with light detected at the respective location within the volume of the sample exceeds a threshold.

Item 50. The optical modulation module of item 47, wherein the object of interest in the sample is a neuron.

Item 51. The optical modulation module of item 47, wherein to determine whether the object of interest is present at the respective location within the volume of the sample associated with each beamlet of the plurality of beamlets associated with each laser pulse the optical modulation module is configured to perform an operation of: analyzing signals associated with light detected at the respective location in the sample using a factorization algorithm to determine whether the object of interest is present at the respective location.

Item 52. The optical modulation module of item 51, wherein the factorization algorithm is a Constrained Nonnegative Matrix Factorization.

Item 53. The optical modulation module of item 47, wherein to determine whether the object of interest is present at the respective location within the volume of the sample associated with each beamlet of the plurality of beamlets associated with each laser pulse the optical modulation module is configured to perform an operation of: determining whether the object of interest is present at the respective location within the volume based on change-point detection of signals associated with light detected at the respective location within the volume.

Item 54. The optical modulation module of item 47, wherein to determine whether the object of interest is present at the respective location within the volume of the sample associated with each beamlet of the plurality of beamlets associated with each laser pulse the optical modulation module is configured to perform an operation of: determining whether the object of interest is present at the respective location within the volume based on cumulative history weighting of signals associated with light detected at the respective location in the volume of the sample.

Item 55. The optical modulation module of item 47, wherein to determine whether the object of interest is present at the respective location within the volume of the sample associated with each beamlet of the plurality of beamlets associated with each laser pulse the optical modulation module is configured to perform an operation of: focusing the optically modulated beamlets on the sample to cause an indicator on the sample to fluoresce.

Item 56. A method for operating an optical modulation module, the method comprising: receiving a plurality of beamlets associated with each laser pulse of a plurality of laser pulses, wherein each beamlet associated with a laser pulse is associated with a different axial or lateral position within a volume of a sample; determining whether an object of interest is present at a respective location within the volume of the sample associated with each beamlet of the plurality of beamlets associated with each laser pulse; selectively adjust the amount of power associated with a set of beamlets from the plurality of beamlets for which no object of interest is located at the respective location in the volume associated with the respective location in the volume of the sample associated with the respective beamlet to reduce an amount of light associated with the set of beamlets from reaching the sample to generate modified beamlets; and outputting the modified beamlets.

Item 57. The method of item 56, wherein reducing an amount of power associated with a set of beamlets further comprises: deflecting the set of beamlets from the plurality of beamlets to prevent the set of beamlets from reaching the sample.

Item 58. The method of item 56, wherein determining whether the object of interest is present at the respective location within the volume of the sample associated with each beamlet of the plurality of beamlets associated with each laser pulse further comprises: determining whether a signal associated with fluorescence associated with a respective location within the sample exceeds a threshold.

Item 59. The method of item 56, wherein the object of interest in the samples is a neuron.

Item 60. The method of item 56, wherein determining whether the object of interest is present at the respective location within the volume of the sample associated with each beamlet of the plurality of beamlets associated with each laser pulse further comprises: determining whether a signal associated with light detected at the respective location within the volume of the sample exceeds a threshold.

Item 61. The method of item 56, wherein determining whether the object of interest is present at the respective location within the volume of the sample associated with each beamlet of the plurality of beamlets associated with each laser pulse further comprises: analyzing signals associated with light detected at the respective location in the sample using a factorization algorithm to determine whether the object of interest is present at the respective location.

Item 62. The method of item 61, wherein the factorization algorithm is a Constrained Nonnegative Matrix Factorization.

Item 63. The method of item 56, wherein determining whether the object of interest is present at the respective location within the volume of the sample associated with each beamlet of the plurality of beamlets associated with each laser pulse further comprises: determining whether the object of interest is present at the respective location within the volume based on change-point detection of signals associated with light detected at the respective location within the volume.

Item 64. The method of item 56, wherein determining whether the object of interest is present at the respective location within the volume of the sample associated with each beamlet of the plurality of beamlets associated with each laser pulse further comprises: determining whether the object of interest is present at the respective location within the volume based on cumulative history weighting of signals associated with light detected at the respective location in the volume of the sample.

Item 65. The method of item 56, wherein determining whether the object of interest is present at the respective location within the volume of the sample associated with each beamlet of the plurality of beamlets associated with each laser pulse further comprises: focusing the optically modulated beamlets on the sample to cause an indicator on the sample to fluoresce using the two photon or multi-photon excitation scanning microscope.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of operating a multiplexing module integrated with an imaging device comprising a two photon or multi-photon excitation scanning microscope, the method comprising:
   receiving a plurality of laser pulses from a pulsed laser source;
   directing the plurality of laser pulses into a first re-imaging cavity;
   splitting each laser pulse of the plurality of laser pulses into a plurality of beamlets;
   introducing a delay between each adjacent beamlet of the plurality of beamlets, such that the plurality of beamlets associated with a respective laser pulse of the plurality of laser pulses is distributed equally across a pulse repetition period associated with the pulsed laser source;
   changing a divergence of each subsequent beamlet of the plurality of beamlets associated with each respective laser pulse to introduce a distinguishing feature between each beamlet of the plurality of beamlets to cause each beamlet to focus on a different axial plane or lateral position of a sample;
   outputting the plurality of beamlets associated with each respective laser pulse from the multiplexing module;
   receiving, at the two photon or multi-photon excitation scanning microscope, the plurality of beamlets of the plurality of beamlets associated with each respective laser pulse from the multiplexing module; and
   converting divergences associated with the plurality of beamlets into axial or lateral foci on the sample using the two photon or multi-photon excitation scanning microscope.

2. A method of operating a multiplexing module, the method comprising:
   receiving a plurality of laser pulses from a pulsed laser source;

directing the plurality of laser pulses into a first re-imaging cavity;
splitting each laser pulse into a plurality of beamlets;
introducing a delay between each adjacent beamlet of the plurality of beamlets, such that the plurality of beamlets associated with a respective laser pulse of the plurality of laser pulses is distributed equally across a pulse repetition period associated with the pulsed laser source;
changing a divergence of each subsequent beamlet of the plurality of beamlets associated with each respective laser pulse to cause each beamlet to focus on a different axial plane;
outputting the plurality of beamlets associated with each respective laser pulse from the first re-imaging cavity into a second re-imaging cavity;
splitting the plurality of beamlets output by the first re-imaging cavity into a plurality of second beamlets for each respective laser pulse;
introducing a delay and a lateral offset between each adjacent beamlet of the plurality of beamlets;
increasing the divergence of each subsequent beamlet of the plurality of second beamlets associated with each respective laser pulse; and
outputting the plurality of second beamlets from the second re-imaging cavity.

3. A method of operating a multiplexing module, the method comprising:
receiving a plurality of laser pulses from a pulsed laser source;
directing the plurality of laser pulses into a first re-imaging cavity;
splitting each laser pulse into a plurality of beamlets;
introducing a delay between each adjacent beamlet of the plurality of beamlets, such that the plurality of beamlets associated with a respective laser pulse of the plurality of laser pulses is distributed equally across a pulse repetition period associated with the pulsed laser source;
changing a divergence of each subsequent beamlet of the plurality of beamlets associated with each respective laser pulse to cause each beamlet of the plurality of beamlets to cause each beamlet to focus on a different lateral position of a sample;
outputting the plurality of beamlets associated with each respective laser pulse from the first re-imaging cavity into a second re-imaging cavity;
splitting the plurality of beamlets output by the first re-imaging cavity into a plurality of second beamlets for each respective laser pulse;
introducing a delay between each adjacent beamlet of the plurality of beamlets;
increasing the divergence of each subsequent beamlet of the plurality of second beamlets associated with each respective laser pulse; and
outputting the plurality of second beamlets from the second re-imaging cavity.

4. A method of operating a multiplexing module comprising a re-imaging cavity, the method comprising:
receiving a plurality of laser pulses from a pulsed laser source;
splitting each laser pulse into a plurality of beamlets, wherein splitting each laser pulse further comprises:
rotating a plane of polarization of each laser pulse by passing the laser pulse through an electro optical modulator (EOM);
directing the laser pulse around the multiplexing module to a half-wave plate (HWP);
passing each laser pulse through a half-wave plate (HWP) to change the plane of polarization of the laser pulse by a fixed amount such that a chosen portion of the laser pulse can pass through a polarized beam splitter (PSB); and
directing the laser pulse to the PSB to cause a first portion of the laser pulse to pass through the PSB and exit the multiplexing module as a beamlet of the plurality of beamlets and a second portion of the laser pulse which is directed back into the re-imaging cavity;
introducing a delay between each adjacent beamlet of the plurality of beamlets, such that the plurality of beamlets associated with a respective laser pulse of the plurality of laser pulses is distributed equally across a pulse repetition period associated with the pulsed laser source;
changing a divergence of each subsequent beamlet of the plurality of beamlets associated with each respective laser pulse to introduce a distinguishing feature between each beamlet of the plurality of beamlets to cause each beamlet to focus on a different axial plane or lateral position of a sample; and
outputting the plurality of beamlets associated with each respective laser pulse.

5. The method of claim 4, the method further comprising:
adjusting a pulse energy by a selected amount for each subsequent beamlet of the plurality of beamlets by selecting the HWP having a rotation angle configured to cause the pulse energy to be adjusted by the selected amount for each subsequent beamlet of the plurality of beamlets.

6. The method of claim 4, wherein introducing the delay between each adjacent beamlets of the plurality of beamlets the multiplexing module is configured to perform operations of:
directing the second portion of the laser pulse around a series of mirrors of the re-imaging cavity to introduce the delay between adjacent beamlets.

7. The method of claim 6, wherein the series of mirrors comprises curved mirrors, and wherein the delay is configurable by changing a distance between the mirrors and focal lengths of the mirrors.

8. The method of claim 6, wherein the series of mirrors comprise flat mirrors and lenses, and wherein the delay is configurable by changing a distance between the mirrors and focal lengths of the lenses.

9. A method of operating a multiplexing module, the method comprising:
receiving a plurality of laser pulses from a pulsed laser source;
splitting each laser pulse into a plurality of beamlets;
focusing the plurality of beamlets onto a first knife edge (KE) mirror that is vertically oriented which directs the plurality of beamlets into a re-imaging cavity of the multiplexing module to cause the plurality of beamlets to make a round trip of the multiplexing module;
introducing a delay between each adjacent beamlet of the plurality of beamlets, such that the plurality of beamlets associated with a respective laser pulse of the plurality of laser pulses is distributed equally across a pulse repetition period associated with the pulsed laser source;
changing a divergence of each subsequent beamlet of the plurality of beamlets associated with each respective laser pulse to introduce a distinguishing feature between each beamlet of the plurality of beamlets to cause each beamlet to focus on a different axial plane or lateral position of a sample; and outputting the plurality of beamlets associated with each respective laser pulse.

10. The method of claim 9 further comprising:

splitting off a respective beamlet of the plurality of beamlets using a second KE mirror that is vertically oriented for each roundtrip around the multiplexing module; and outputting the respective beamlet after corresponding number of roundtrips associated with its intended delay from the multiplexing module.

11. A multiplexing module comprising:

a first lens disposed in a first cavity of the multiplexing module configured for receiving a plurality of laser pulses from a pulsed laser source and for directing the plurality of laser pulses into the first cavity;

a beam splitter disposed in the first cavity configured to:

split each laser pulse into a plurality of beamlets, introduce a delay between each adjacent beamlet of the plurality of beamlets, such that the plurality of beamlets associated with a respective laser pulse of the plurality of laser pulses is distributed equally across a pulse repetition period associated with the pulsed laser source, and adjust a pulse energy of each laser pulse by a selected amount for each adjacent beamlet of the plurality of beamlets, the beam splitter having a splitting ratio configured to cause the pulse energy to be adjusted by the selected amount; and a mirror for changing a divergence of each subsequent beamlet of the plurality of beamlets associated with each respective laser pulse to introduce a distinguishing feature between each beamlet of the plurality of beamlets to cause each beamlet to focus on a different axial plane or lateral position of a sample;

wherein the beam splitter outputs the plurality of beamlets associated with each respective laser pulse from the first cavity.

12. The multiplexing module of claim 11, wherein the multiplexing module comprises a re-imaging cavity, and wherein splitting each laser pulse into a plurality of beamlets further comprises:

passing each laser pulse through a beam splitter to split the laser pulse into a beamlet of the plurality of beamlets to be output by the multiplexing module and a second portion of the laser pulse to reenter the re-imaging cavity.

* * * * *